(12) United States Patent
Yu et al.

(10) Patent No.: US 10,904,866 B2
(45) Date of Patent: Jan. 26, 2021

(54) INFORMATION TRANSMISSION METHOD, USER EQUIPMENT, ACCESS NETWORK DEVICE, AND CORE NETWORK DEVICE

(71) Applicant: Huawei Technologies Co., Ltd., Guangdong (CN)

(72) Inventors: Feng Yu, Beijing (CN); Tao Zhang, Beijing (CN); Haifeng Yu, Beijing (CN); Guangwei Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 78 days.

(21) Appl. No.: 16/206,289

(22) Filed: Nov. 30, 2018

(65) Prior Publication Data
US 2019/0098691 A1 Mar. 28, 2019

Related U.S. Application Data

(63) Continuation of application No. PCT/CN2016/084822, filed on Jun. 3, 2016.

(51) Int. Cl.
*H04W 76/11* (2018.01)
*H04W 72/04* (2009.01)
*H04W 60/00* (2009.01)
*H04W 76/18* (2018.01)
*H04W 76/28* (2018.01)
*H04W 76/27* (2018.01)
(Continued)

(52) U.S. Cl.
CPC ....... *H04W 72/0413* (2013.01); *H04W 12/06* (2013.01); *H04W 48/16* (2013.01); *H04W 60/00* (2013.01); *H04W 76/11* (2018.02); *H04W 76/18* (2018.02); *H04W 76/27* (2018.02); *H04W 76/28* (2018.02); *H04W 88/06* (2013.01); *H04W 92/10* (2013.01)

(58) Field of Classification Search
None
See application file for complete search history.

(56) References Cited

U.S. PATENT DOCUMENTS 9,113,450 B2    8/2015   Pelletier et al.
2008/0042912 A1*   2/2008   Lee ...................... H04B 5/0018
                                                                                           343/713

(Continued)

FOREIGN PATENT DOCUMENTS

CN          1997207 A     7/2007
CN       102422568 A     4/2012
(Continued)

*Primary Examiner* — Ayanah S George
(74) *Attorney, Agent, or Firm* — Kilpatrick Townsend & Stockton LLP

(57) ABSTRACT

The present disclosure discloses an information transmission method, user equipment, an access network device, and a core network device. The method includes: determining, by user equipment UE when the UE is in an idle state, whether there is to-be-transmitted uplink information; and sending, by the UE, a first request message to a first access network device when the UE determines that there is to-be-transmitted uplink information, where the first request message is a first air interface message for the UE to switch from the idle state to a connected state, and the first request message carries uplink non-access stratum NAS information and air interface identity information that is stored on the UE.

15 Claims, 6 Drawing Sheets

(51) Int. Cl.
*H04W 12/06* (2009.01)
*H04W 48/16* (2009.01)
*H04W 88/06* (2009.01)
*H04W 92/10* (2009.01)

(56) References Cited

U.S. PATENT DOCUMENTS

| | | | |
|---|---|---|---|
| 2009/0089431 A1* | 4/2009 | Kim | H04L 63/0272 |
| | | | 709/226 |
| 2012/0246325 A1* | 9/2012 | Pancorbo Marcos | |
| | | | H04L 63/102 |
| | | | 709/227 |
| 2015/0052234 A1* | 2/2015 | Hahn | H04L 49/15 |
| | | | 709/223 |
| 2015/0208450 A1 | 7/2015 | Mademann et al. | |
| 2015/0282214 A1 | 10/2015 | Lee et al. | |
| 2015/0327312 A1* | 11/2015 | Burbidge | H04W 76/14 |
| | | | 370/329 |
| 2016/0105917 A1 | 4/2016 | Miao et al. | |
| 2016/0135236 A1 | 5/2016 | Zhu et al. | |

FOREIGN PATENT DOCUMENTS

| | | |
|---|---|---|
| CN | 102457825 A | 5/2012 |
| CN | 103402187 A | 11/2013 |
| CN | 104508996 A | 4/2015 |
| CN | 104521313 A | 4/2015 |
| CN | 104756586 A | 7/2015 |
| EP | 2645803 A1 | 10/2013 |
| EP | 3001580 A1 | 3/2016 |
| EP | 3002988 A1 | 4/2016 |
| WO | 2011/110022 A1 | 9/2011 |
| WO | 2014047920 A1 | 4/2014 |
| WO | 2014065593 A1 | 5/2014 |
| WO | 2016/064458 A1 | 4/2016 |

* cited by examiner

300

INFORMATION TRANSMISSION METHOD, USER EQUIPMENT, ACCESS NETWORK DEVICE, AND CORE NETWORK DEVICE

CROSS-REFERENCE TO RELATED APPLICATIONS

This application is a continuation of International Application No. PCT/CN2016/084822, filed on Jun. 3, 2016, the disclosure of which is hereby incorporated by reference in its entirety.

TECHNICAL FIELD

The present disclosure relates to the communications field, and in particular, to an information transmission method, user equipment, an access network device, and a core network device.

BACKGROUND

In Long Term Evolution (LTE), when there is neither data transmission service nor voice service for user equipment (UE) within a time period, to save air interface resources and a quantity of electricity of the UE, the UE may be switched to an idle state. Accordingly, a bearer related to an access network device is temporarily deleted. For example, in this case, a bearer between a core network device and the access network device is deleted, and a bearer between the access network device and the UE is also deleted.

When the UE is switched from the idle state to a connected state, the UE needs to first camp on a suitable cell based on cell selection, and then establish a connection to a base station by using a random access process. The prior art provides a solution in which a data transmission channel is established between UE and a core network device when the UE is switched from an idle state to a connected state. A specific solution is shown in FIG. 1. When the UE is switched from the idle state to the connected state, the UE first sends a preamble to a base station. The base station may simultaneously respond to random access requests of some or all UEs in a plurality of preambles. The random access response includes a UE identity (Identity, ID) allocated by the base station to UE selected to be scheduled. When UE determines that the UE is the UE to be scheduled by the base station, the UE initiates an air interface connection request by using the UE ID allocated by the base station. After the UE receives a response message of the base station for the air interface connection request, the UE carries non-access stratum (NAS) data on an uplink resource.

However, according to the solution in which a connection is established between UE and a core network device when the UE is switched from an idle state to a connected state, the UE needs to perform signaling interaction with the base station for many times to establish a data transmission channel, resulting in relatively low efficiency.

SUMMARY

In view of this, embodiments of the present disclosure provide an information transmission method and an apparatus, so that user equipment can access an access network device and a core network device more rapidly in a process of switching from an idle state to a connected state, thereby reducing overheads of air interface signaling.

According to a first aspect, an information transmission method is provided. The method includes: determining, by user equipment UE when the UE is in an idle state, whether there is to-be-transmitted uplink information; and sending a first request message to a first access network device when determining that there is to-be-transmitted uplink information, where the first request message is a first air interface message for the UE to switch from the idle state to a connected state, and the first request message carries uplink non-access stratum NAS information and air interface identity information that is stored on the UE.

When the user equipment enters the connected state from the idle state, the first air interface message is sent to the first access network device by using the air interface identity information that is stored on the UE, and the NAS information is directly carried in the first air interface message. In this way, the user equipment can rapidly access an access network device and a core network device, thereby reducing overheads of air interface signaling.

With reference to the first aspect, in a first possible implementation of the first aspect, the uplink NAS information includes an attach request message, and before the UE determines whether there is to-be-transmitted uplink information, the method further includes: storing, by the UE, air interface identity information that is pre-allocated by the first access network device to the UE before the UE performs an attach process, where the air interface identity information corresponds to at least one UE that communicates with the first access network device.

By allocating fixed air interface identity information to at least one UE communicating with the access network device, the attach request message can be carried in the first air interface message for the UE, to complete registration of the UE with the core network device, thereby reducing a quantity of pieces of air interface signaling.

With reference to some implementations of the first aspect, in a second possible implementation of the first aspect, the method further includes: receiving, by the UE, a response message sent by the first access network device, where the response message carries attach success indication information and dedicated air interface identity information of the UE, and the dedicated air interface identity information is allocated by the core network device or the first access network device to the UE; and storing, by the UE, the dedicated air interface identity information, and performing information transmission with the UE by using the dedicated air interface identity information.

The response message received by the UE may further carry downlink NAS information of the UE. The downlink NAS information includes NAS identity information of the UE. The UE may determine, based on the NAS identity information, that the UE is UE scheduled by the core network device, so that the UE may perform information transmission with the first access network device based on the dedicated air interface identity information.

The UE may further receive an access rejection message sent by the first access network device. The access rejection message carries attach rejection information and the air interface identity information pre-allocated to the UE.

With reference to some implementations of the first aspect, in a third possible implementation of the first aspect, the uplink NAS information includes NAS data, and before the UE determines whether there is to-be-transmitted uplink information, the method further includes: receiving, by the UE, dedicated air interface identity information sent by the first core network device, where the dedicated air interface identity information is allocated by the core network device or the first access network device to the UE; and storing, by the UE, the dedicated air interface identity information.

By storing the dedicated air interface identity information sent by the access network device or the core network device, the UE does not need to negotiate, every time the user equipment wakes up from the idle state, with the access network device on an air interface about an air interface identity.

With reference to some implementations of the first aspect, in a fourth possible implementation of the first aspect, the uplink NAS information includes NAS data, and the sending, by the UE, a first request message to a first access network device includes: sending, by the UE, the first request message to the first access network device when the UE determines that an access network device communicating with the UE has been switched to the first access network device, where the first request message further carries indication information, and the indication information is used to indicate that the access network device communicating with the UE has been switched.

According to a second aspect, an information transmission method is provided. The method includes: receiving, by a first access network device, a first request message sent by user equipment UE, where the first request message is a first air interface message for the UE to switch from an idle state to a connected state, the first request message carries an attach request message and air interface identity information that is pre-allocated by the first access network device to the UE before the UE performs an attach process, where the air interface identity information corresponds to at least one UE that communicates with the first access network device; obtaining, by the first access network device, dedicated air interface identity information of the UE based on the first request message, and sending, by the first access network device, the dedicated air interface identity information of the UE to the UE.

When the user equipment needs to register with a core network, by directly carrying the attach request message in the first air interface message, the UE can rapidly complete an attach process, thereby reducing a quantity of pieces of air interface signaling.

With reference to the second aspect, in a first possible implementation of the second aspect, the obtaining, by the first access network device, dedicated air interface identity information of the UE based on the first request message includes: the obtaining, by the first access network device, dedicated air interface identity information of the UE based on the first request message includes: allocating, by the first access network device, the dedicated air interface identity information to the UE based on the first request message.

With reference to some implementations of the second aspect, in a second possible implementation of the second aspect, the method further includes: sending, by the first access network device, a second request message to a core network device, where the second request message carries the attach request message and the dedicated air interface identity information.

The access network device allocates the dedicated air interface identity information to the user equipment and sends the dedicated air interface identity information to the core network device, thereby facilitating management of the air interface identity information by the core network device.

With reference to some implementations of the second aspect, in a third possible implementation of the second aspect, the obtaining, by the first access network device, a dedicated air interface identity of the UE based on the first request message includes: sending, by the first access network device, a third request message to a core network device, where the third request message carries the attach request message; receiving, by the first access network device, an acknowledgement message sent by the core network device, where the acknowledgement message carries the dedicated air interface identity information; and obtaining, by the first access network device, the dedicated air interface identity information of the UE from the acknowledgement message.

With reference to some implementations of the second aspect, in a fourth possible implementation of the second aspect, the method includes: determining, by the first access network device based on the first request message, to allow the UE to access the first access network device.

By obtaining dedicated air interface identity information after it is determined that the first access network device allows new UE to access, a problem that load of the access network device cannot bear when the UE performs the attach process on the core network device is avoided.

The first access network device may determine, based on the first request message, whether the first access network device allows new UE to access, and if allowing new UE to access, the first access network device forwards the NAS information; or if not allowing new UE to access, the first access network device may directly reject the UE.

Optionally, when the uplink NAS information is an attach request message, the rejection message carries fixed air interface identity information pre-allocated by the first access network device to the UE. When the uplink NAS information is NAS data, the rejection message carries dedicated air interface identity information allocated by the first access network device or the core network device to the UE.

Optionally, the first access network device receives indication information sent by the UE, and the indication information is used to indicate that the access network device communicating with the UE has been switched to the first access network device. The first access network device may forward the indication information to the core network device and receive new dedicated air interface identity information allocated by the core network device to the UE on the first access network device. The first access network device sends the new dedicated air interface identity information to the UE.

With reference to some implementations of the second aspect, in the second possible implementation of the second aspect, the sending the dedicated air interface identity information to the UE includes: sending, by the first access network device, a response message to the UE, where the response message carries attach success indication information and the dedicated air interface identity information.

Optionally, the method includes: receiving, by the first access network device, a third request message sent by the user equipment UE, where the third request message is a first air interface message for the UE to switch from an idle state to a connected state, and the third request message carries NAS data and dedicated air interface identity information of the UE; and forwarding, by the first access network device, the NAS data and the dedicated air interface identity information to the core network device, to facilitate initial authentication on the core network device.

This reduces a delay for sending the NAS data when the user equipment wakes up from the idle state.

According to a third aspect, an information transmission method is provided. The method includes: receiving, by a core network device, a first request message sent by user equipment UE and forwarded by a first access network device, where the first request message carries dedicated air interface identity information of the UE; determining, by the core network device based on the dedicated air interface identity information and stored air interface identity information, whether the dedicated air interface identity information exists on the core network device; and sending, by the core network device, a first acknowledgement message to the first access network device when determining that the dedicated air interface identity information exists on the core network device, where the first acknowledgement message is used to indicate that the UE is allowed to perform information transmission with the first access network device by using the dedicated air interface identity information.

By storing the air interface identity information by the core network device, air interface signaling used for establishing NAS signaling connections every time the UE wakes up from the idle state can be reduced. In addition, after the access network device is restarted, even if air interface identity information that cannot be identified is received, the UE can be initially authenticated through interaction between the first access network device and a core network, thereby simplifying a communication procedure on an air interface.

With reference to the third aspect, in a first possible implementation of the third aspect, before the receiving, by a core network device, a first request message sent by user equipment UE and forwarded by a first access network device, the method further includes: receiving a second request message sent by the first access network device, where the second request message carries an attach request message and the dedicated air interface identity information; and storing, by the core network device, the dedicated air interface identity information after determining that the UE is successfully attached.

With reference to some implementations of the third aspect, in a second possible implementation of the third aspect, before the receiving, by a core network device, a first request message sent by user equipment UE and forwarded by a first access network device, the method further includes: receiving, by the core network device, a third request message sent by the UE and forwarded by the first access network device, where the third request message carries an attach request message; allocating, by the core network device, dedicated air interface identity information to the UE after determining that the UE is successfully attached; sending, by the core network device, a second acknowledgement message to the first access network device, where the second acknowledgement message carries attach success indication information and the dedicated air interface identity information; and, storing, by the core network device, the dedicated air interface identity information.

With reference to some implementations of the third aspect, in a third possible implementation of the third aspect, the method further includes: receiving, by the core network device, indication information sent by the first access network device, where the indication information is used to indicate that the access network device communicating with the UE has been switched from a second access network device to the first access network device; allocating, by the core network device based on the indication information, dedicated air interface identity information that corresponds to the first access network device to the UE; changing, by the core network device, the stored air interface identity information from dedicated air interface identity information of the UE corresponding to the second access network device to the dedicated air interface identity information of the UE corresponding to the first access network device; and sending, by the core network device to the first access network device, the dedicated air interface identity information of the UE corresponding to the first access network device.

According to a fourth aspect, user equipment is provided. The user equipment is configured to perform the method according to the first aspect or any possible implementation of the first aspect. Specifically, the user equipment includes a unit configured to perform the method according to the first aspect or any possible implementation of the first aspect.

According to a fifth aspect, an access network device is provided. The access network device is configured to perform the method according to the second aspect or any possible implementation of the second aspect. Specifically, the access network device includes a unit configured to perform the method according to the second aspect or any possible implementation of the second aspect.

According to a sixth aspect, a core network device is provided. The core network device is configured to perform the method according to the third aspect or any possible implementation of the third aspect. Specifically, the core network device includes a unit configured to perform the method according to the third aspect or any possible implementation of the third aspect.

According to a seventh aspect, user equipment is provided. The user equipment includes: a processor, a memory, and a transceiver. The memory is configured to store one or more instructions. The instruction is configured for execution by the processor, and the instruction is used to implement the method according to the first aspect.

According to an eighth aspect, an access network device is provided. The access network device includes: a processor, a memory, and a transceiver. The memory is configured to store one or more instructions. The instruction is configured for execution by the processor, and the instruction is used to implement the method according to the second aspect.

According to a ninth aspect, a core network device is provided. The core network device includes: a processor, a memory, and a transceiver. The memory is configured to store one or more instructions. The instruction is configured for execution by the processor, and the instruction is used to implement the method according to the third aspect.

According to a tenth aspect, a computer storage medium is provided. The computer storage medium is configured to store a computer software instruction that is used in the foregoing method and that includes a program designed to perform the foregoing aspects.

In the present disclosure, names of the UE, the access network device, and the core network device constitute no limitation on the devices. During actual implementation, these devices may appear with other names. Provided that functions of the devices are similar to those in the present disclosure, the devices fall within the scope of the claims in the present disclosure and their equivalent technologies.

These or other aspects of the present disclosure are more concise and comprehensible in descriptions of the following embodiments.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and describes the technical solutions in the embodiments of the present disclosure with reference to the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

It should be understood that, the technical solutions in the embodiments of the present disclosure may be applied to various communications systems, such as a Global System for Mobile Communications (GSM), a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD) system, a Universal Mobile Telecommunications System (UMTS), a Worldwide Interoperability for Microwave Access (WiMAX) communications system, and a future 5G system.

Especially, the technical solutions according to the embodiments of the present disclosure may be applied to various communications systems that are based on a non-orthogonal multiple access technology, for example, a sparse code multiple access (SCMA) system or a low density signature (LDS) system. Certainly, the SCMA system and the LDS system may also have other names in the communications field. Further, the technical solutions according to the embodiments of the present disclosure may be applied to a multi-carrier transmission system using the non-orthogonal multiple access technology, for example, an orthogonal frequency division multiplexing (OFDM) system, a filter bank multi-carrier (FBMC) system, a Generalized Frequency Division Multiplexing (GFDM) system, or a filtered orthogonal frequency division multiplexing (Filtered-OFDM, F-OFDM) system that uses the non-orthogonal multiple access technology.

Figure 2:
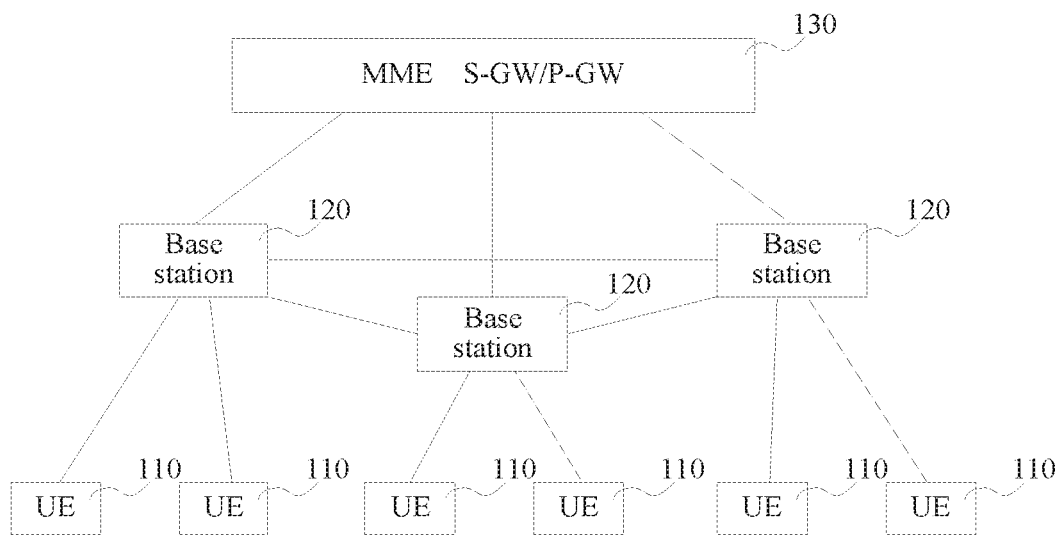
FIG. 2 is a schematic diagram of an implementation environment according to an embodiment of the present disclosure.

FIG. 2 is a schematic diagram of an implementation environment according to an embodiment of the present disclosure. The implementation environment includes: a terminal device 110, an access network device 120, and a core network device 130. An S interface is used for communication between an access network device and a core network device, an X2 interface is used for communication between access network devices, and a Uu interface is used for communication between a terminal device and an access network device.

In this embodiment of the present disclosure, the terminal device 110 may communicate with one or more core networks by using a radio access network (Radio Access Network, "RAN" for short). The terminal device may be referred to as an access terminal, user equipment (User Equipment, "terminal device" for short), a subscriber unit, a subscriber station, a mobile station, a mobile console, a remote station, a remote terminal, a mobile device, a user terminal, a terminal, radio communications equipment, a user agent, or a user apparatus. The access terminal may be a cellular phone, a cordless phone, a Session Initiation Protocol (Session Initiation Protocol, "SIP" for short) phone, a wireless local loop (Wireless Local Loop, "WLL" for short) station, a personal digital assistant (Personal Digital Assistant, PDA for short), a handheld device having a wireless communication function, a computing device, another processing device connected to a wireless modem, an in-vehicle device, a wearable device, and a terminal device in a future 5G (5th Generation) network.

The access network device 120 is a network element in an access network. As shown in FIG. 2, using a Universal Mobile Telecommunications System (UMTS) as an example, the access network node 120 may be a NodeB (Node B), or may be a radio network controller (RNC) (not shown). In a Long Term Evolution (LTE) wireless network architecture, a base station is an evolved NodeB (eNB).

The core network device 130 is a network element in a core network (CN). As shown in FIG. 2, using an LTE wireless network architecture as an example, the core network device 130 includes an MME and a serving gateway (S-GW)/PDN gateway (P-GW). The MME is mainly configured to perform mobility management and session management on the terminal device 110. The S-GW is mainly responsible for forwarding data between the eNB and the P-GW. The P-GW is mainly responsible for processing an Internet Protocol (IP) data service.

With development of the mobile Internet industry and the Internet of Things industry, more mobile terminals are connected to share richer data. Operators and cellular technologies face challenges of an increase of thousands of times or tens of thousands of times of mobile data traffic, and only licensed spectrums of operators cannot satisfy rapidly growing data requirements. Unlicensed spectrums, due to characteristics of being free and having many spectrum resources, can be used as a supplementary and collaborative means of the cellular technologies, to help operators resolve problems such as burst and excess of data traffic on a cellular network, occupation of excessive radio resources and overloading of a network in data service offloading.

Although having the advantages such as being free and having adequate spectrum resources, compared with licensed spectrums of operators, unlicensed spectrums also have limitations. For example, each region imposes corresponding regulations on application of unlicensed spectrums, to prevent irregular and unrestricted transmission of all devices on the unlicensed spectrums. The regulations are basically based on two types of restrictions. One restriction is based on a rule of listen before talk (LBT), that is, any device needs to listen to a channel for a time period before sending data, and can occupy the channel only when the channel is continuously idle over a time period. The other restriction is based on a low duty cycle low duty cycle, that is, any device can send data without listening to a channel first, but needs to satisfy a particular transmission duty cycle. To be specific, a total transmission time period of the device within a particular time period cannot exceed a threshold. In LTE, almost uplink transmission of all UEs is based on scheduling (where a random access request message is excluded). A base station allocates, in advance, an uplink transmission resource to UE, and operators can prevent, through network deployment or base station scheduling, transmission between different base stations and UEs from interfering with each other. Unlike a manner in which transmissions are centrally controlled by a base station for licensed spectrums, for unlicensed spectrums, a contention-based transmission manner is mostly used. Unlicensed spectrums can be used for free by all organizations provided that a local regulation is satisfied. Therefore, even if UE in a current system can be scheduled, it cannot be ensured that the UE is not interfered with by another system. This is because the current system cannot limit a transmission action of the another system. For unlicensed spectrums, there are some classic protocols such as an 802.11 series, an 802.15.4 series, as well as private protocols such as lora and sigfox. In all these protocols, data is transmitted based on an LBT contention manner or a low duty cycle contention manner.

Figure 1:
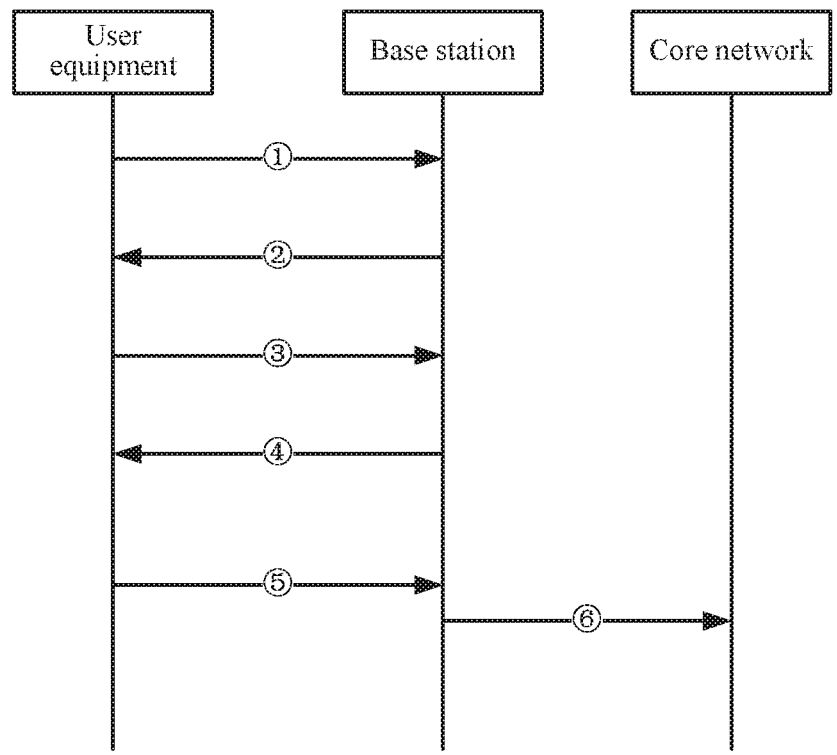
FIG. 1 is a schematic flowchart of an attach process of user equipment when the user equipment is powered on in the prior art.

In LTE, when being initially powered on or switched from an idle state to a connected state, UE first camps on a suitable cell based on cell selection, establishes a connection to a base station by using a random access process, and then accesses a core network by using an attach process and registers with the core network. As shown in FIG. 1, in the prior art, an attach process of UE when the UE is powered on mainly includes the following steps.

Step 1: The UE in an RRC idle state performs an attach process and initiates a random access process first. The random access process is a most fundamental function that a cellular system should have and makes it possible for a terminal to establish a communication connection to a network. Randomness of users and complexity of radio environments lead to randomness of initiation of such access and used resources. In other words, the UE sends a random access preamble that carries a preamble.

Step 2: After receiving the random access preamble, the base station sends a media access layer on a downlink shared channel to generate a random access response. The random access response carries an uplink authorization instruction and a UE ID allocated to the UE.

Step 3: After receiving the random access response, the UE determines whether the random access response is a random access response message of the UE (by using a preamble and location information of the UE), and sends a Radio Resource Control (RRC) connection request message that carries the UE ID to the base station.

Step 4: The base station sends an RRC connection establishment message to the UE. The message includes an RRC message mapped to a downlink control channel.

Step 5: The UE sends an RRC connection establishment complete message to the base station. The message includes a NAS attach request message.

Step 6: The base station sends an initial user message to a core network. The message includes the NAS attach request message.

It can be learned from the foregoing steps that, in the LTE, when switching from the idle state to the connected state, the UE needs to perform information exchanging with a network side (including the core network and the base station) for a plurality of times. This process consumes much energy. Therefore, during designing of a signaling procedure for contention-based transmission, the procedure needs to be properly simplified as much as possible to reduce a quantity of transmission times of air interface signaling.

A person skilled in the art understands that, a protocol stack of a Universal Mobile Telecommunications System is divided into a non-access stratum NAS protocol and an access stratum (AS) protocol. The NAS protocol processes information transmission between UE and a core network, and transmitted content may be user information or control information (for example, information about service establishment, release or mobility management). NAS information is independent of an AS protocol structure below to some extent and is irrelevant to a used radio access network (which may be GSM, GPRS, or WCDMA), and instructs to establish a signaling path between the UE and the core network through AS signaling interaction, so that a NAS signaling procedure can be performed. In other words, transmission of the NAS information is based on an AS protocol on a lower layer. A data processing process of an LTE system is mainly divided into a Radio Resource Control RRC layer, a Packet Data Convergence Protocol (PDCP) layer, a Radio Link Control (RLC) layer, a Media Access Control (MAC) layer, and a physical layer PHY.

It should be understood that, this embodiment of the present disclosure is described by using application to an LTE system as an example, but the present disclosure is not limited thereto. In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Figure 3:
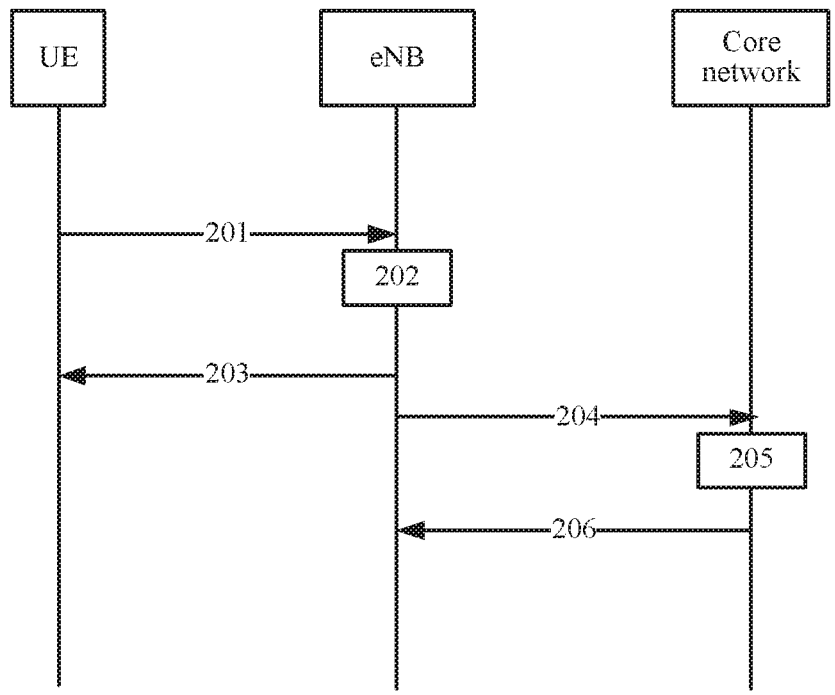
FIG. 3 is a schematic flowchart of an information transmission method according to an embodiment of the present disclosure.

FIG. 2 is a schematic diagram of an implementation environment according to an embodiment of the present disclosure. The following describes, with reference to FIG. 3, an information transmission method 200 according to an embodiment of the present disclosure from the perspective of interaction between user equipment, an access network device, and a core network device. As shown in FIG. 3, the method 200 includes:

S201: When the UE is switched from an idle state to a connected state, the UE directly sends a first request message on an air interface (which is a Radio Resource Control (Radio Resource Control, RRC) layer connection request by default) to the access network device by using air interface identity information that is stored on the UE. The first request message carries non-access stratum (NAS) information. The NAS information may be, for example, an attach request message that needs to be used for an attach process when the user equipment is powered on for the first time, or may be uplink information that needs to be sent to the core network device when the user equipment is not powered-on for the first time and wakes up from the idle state; may be NAS control signaling, or may be NAS data.

It should be understood that, the NAS information cannot be decoded on the air interface. To be specific, the access network device cannot learn a type and content of the NAS information.

Optionally, if the NAS information is an attach request message, the air interface identity information used by the user equipment to send the first request message is a radio network temporary identity (RNTI), for example, 0xFFFF, reserved by the access network device and dedicated for access. The reserved air interface identity information corresponds to at least one user equipment in a cell covered by the access network device. If the uplink NAS information is NAS data, the air interface identity information used by the user equipment for sending the first request information may be a dedicated identity allocated by the core network device or the access network device to the user equipment.

S202: The access network device receives the first request message sent by the UE, where the first request message carries an attach request message and the air interface identity information pre-allocated to the UE; and obtains dedicated air interface identity information of the UE based on the first request message.

Optionally, the access network device allocates dedicated air interface identity information to the UE based on the received first request message and sends the dedicated air interface identity information to the core network device. Alternatively, the access network device forwards the received first request message to the core network device and receives dedicated air interface identity information sent by the core network device.

S203: The access network device sends the dedicated air interface identity information of the UE to the UE.

S204: The core network device receives the first request message sent by the user equipment UE and forwarded by the access network device, where the first request message carries NAS data and the dedicated air interface identity information of the UE.

S205: The core network device determines, based on the dedicated air interface identity information and the stored air interface identity information, whether the dedicated air interface identity information exists on the core network device.

S206: The core network device sends a first acknowledgement message to the access network device when determining that the dedicated air interface identity information exists on the core network device, where the first acknowledgement message is used to indicate that the UE is allowed to perform information transmission with the access network device by using the dedicated air interface identity information.

Therefore, according to the information transmission method in this embodiment of the present disclosure, when the user equipment is switched from the idle state to the connected state, by directly carrying the NAS information in the first air interface message, the user equipment can rapidly establish a NAS signaling connection, thereby reducing overheads of air interface signaling.

The following describes in detail two specific embodiments of the present disclosure from the perspective of a format of a message exchanged between the user equipment, the access network device, and the core network device.

Embodiment 1

Step 1: UE is powered on for the first time and needs to perform an attach process to register with a core network. In this case, the UE does not have a legal UE ID, so that the UE uses a reserved ID (RNTI1) to send a first air interface message to a base station. The first air interface message carries a NAS attach request message. A format of the first air interface message is:

| RNTI1 | Message Type | NAS Message (carrying an attach request message) |
|---|---|---|

Step 2: The base station receives a first air interface identity message in step 1, and establishes, if load allows, a new S1AP ID on an S1 interface, to forward the attach request message carried in the first air interface message to the core network. The core network allocates an RNTI2 to the UE. The RNTI2 is a unique UE identity in each cell covered by the base station. In this case, a format of the S1 interface message is:

| Message Type | S1AP ID | NAS Message (carrying an attach request message) |
|---|---|---|

If the load allows and the base station allocates an RNTI2 to the UE, a format of the S1 interface message is:

| Message Type | S1AP ID | RNTI2 | NAS Message (carrying an attach request message) |
|---|---|---|---|

If the load does not allow, the base station directly sends an access rejection message to the UE. A format of the access rejection message is:

| RNTI1 | Message Type | Reject cause | rejection information (type or uplink transmission location of UE) |
|---|---|---|---|

Step 3: The core network authenticates a NAS identity of the UE in the attach request message, to determine whether to accept an attachment, and if determining to accept an attachment, performs an attach process and allocates an RNTI2 for the UE and adds attach success information and the RNTI2 to an S1 interface message to send the attach success information and the RNTI2 to the base station. In this case, a format of the S1 interface message is:

| Message Type | S1AP ID | RNTI2 | (carrying attach success information) |
|---|---|---|---|

After the core network determines that the UE is successfully attached and the RNTI2 is allocated by the base station, a format of the S1 interface message is:

| Message Type | S1AP ID | NAS Message (carrying attach rejection information) |
|---|---|---|

After determining that the UE fails to attach, the core network sends attach rejection information. A format of the S1 interface message is:

| Message Type | S1AP ID | NAS Message (carrying attach rejection information) |
|---|---|---|

Step 4: If receiving a response message by using an S1 interface, regardless of whether the RNTI2 is carried, the base station sends the attach success information carried in the S1 interface message and the RNTI2 obtained by the base station to the UE by using an air interface message. In this case, a format of the air interface message is:

| RNTI1 | Message Type | RNTI2 | NAS Message (carrying attach success information) |
|---|---|---|---|
| or | | | |
| RNTI2 | Message Type | | NAS Message (carrying attach success information) |

When receiving an access rejection message on the S1 interface, the base station directly forwards, on an air interface, the attach rejection information carried in the S1 interface message to the UE. In this case, a format of the air interface message is:

| RNTI1 | Message Type | Reject cause | NAS Message (carrying attach rejection information) |
|---|---|---|---|

Embodiment 2

Step 1: When UE wakes up from an idle state and finds that there is an RNTI2 and that a cell in which the UE is currently located is the same as a cell in which the UE is located during previous communication, the UE directly uses the RNTI2 to send uplink data. In this case, a format of an air interface message is:

| RNTI2 | Message Type | NAS Message (carrying uplink data) |
|---|---|---|

If the UE wakes up from an idle state and finds that there is an RNTI2 and that a cell in which the UE is currently located is different from a cell in which the UE is located during previous communication, the UE uses an RNTI1 pre-allocated by the cell in which the UE is currently located for the UE to send uplink data, and adds indication information to an air interface message to indicate an old cell identity and an old UE identity. In this case, a format of the air interface message is:

| RNTI2 | Message Type | Indication information | NAS Message (carrying uplink data) |
|---|---|---|---|

Step 2: After the base station receives a message not carrying indication information, if the base station cannot find a context of the RNTI2, the base station establishes a new S1AP ID on an S1 interface for the UE, and forwards a NAS message carried in the message not carrying indication information to the core network. A format of an S1 interface message is:

| Message Type | S1AP ID | RNTI2 | NAS Message (carrying uplink data) |
|---|---|---|---|

After the base station receives a message carrying indication information, if the base station cannot find a context of the RNTI2, the base station establishes a new S1AP ID at an S1 interface for the UE, and forwards the indication information carried in the S1AP ID to the core network. A format of an S1 interface message is:

| Message Type | S1AP ID | Indication information | NAS Message (carrying uplink data) optional |
|---|---|---|---|

Step 3: After receiving the message not carrying indication information, the core network determines whether the RNTI2 exists, and feeds back, if the RNTI2 exists, an S1 interface message to the base station to inform the base station of existence of the RNTI2. A format of the S1 interface message is:

| Message Type | S1AP ID | NAS Message (carrying uplink data) optional |
|---|---|---|

If finding that the RNTI2 does not exist, the core network feeds back an S1 interface message to the base station to inform the base station that the RNTI2 does not exist. A format of the S1 interface message is:

| Message Type | S1AP ID | NAS Message (carrying downlink data) optional |
|---|---|---|

Message Type is used to distinguish whether the RNTI2 exists.

After receiving the message carrying indication information, the core network feeds back, to the base station, an S1 interface message carrying a UE identity RNTI3 reallocated by the base station to the UE. A format of the S1 interface message is:

| Message Type | S1AP ID | RNTI3 | NAS Message (carrying downlink data) optional |
|---|---|---|---|

Step 4: If determining, based on the received S1 interface message, that the RNTI2 exists, the base station continues to use the RNTI2 to receive uplink data of the UE.

If determining, based on the received S1 interface message, that the RNTI2 does not exist, the base station directly discards uplink data of the UE, or sends an air interface connection release message to the UE. A format of the air interface message is:

| Message Type | Release cause |
|---|---|

The foregoing describes the information transmission method according to this embodiment of the present disclosure from the perspective of interaction between the devices.

Figure 4:
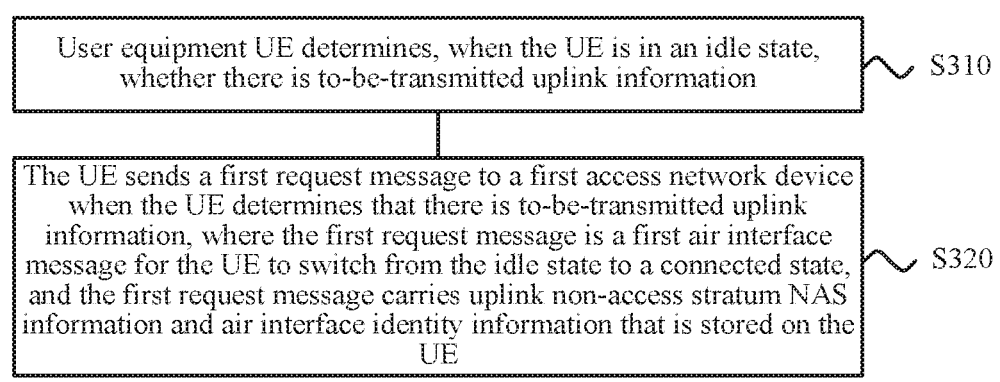
FIG. 4 is a schematic block diagram of an information transmission method according to an embodiment of the present disclosure.
Figure 5:
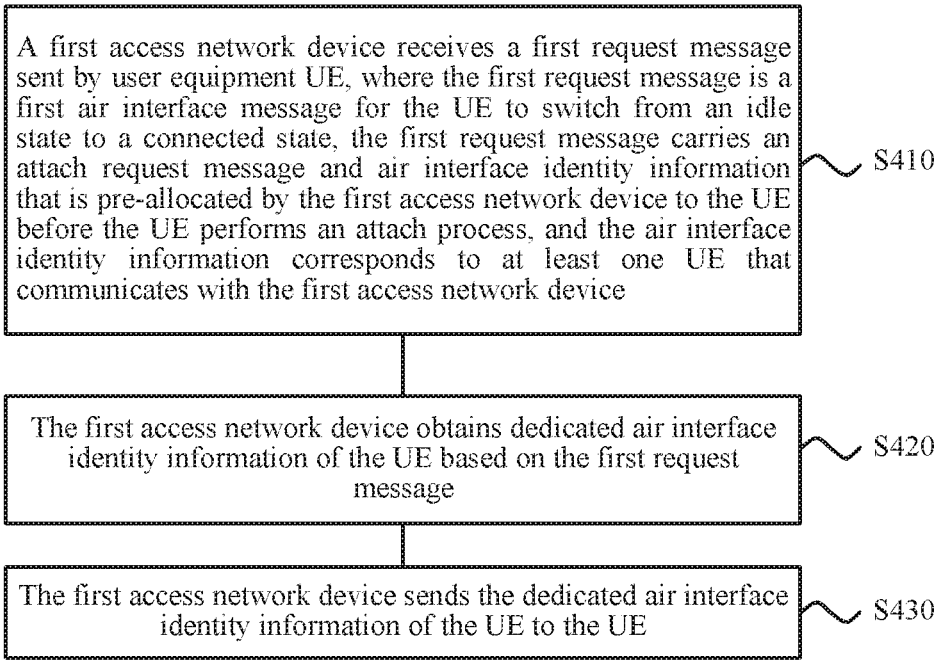
FIG. 5 is another schematic block diagram of an information transmission method according to an embodiment of the present disclosure.
Figure 6:
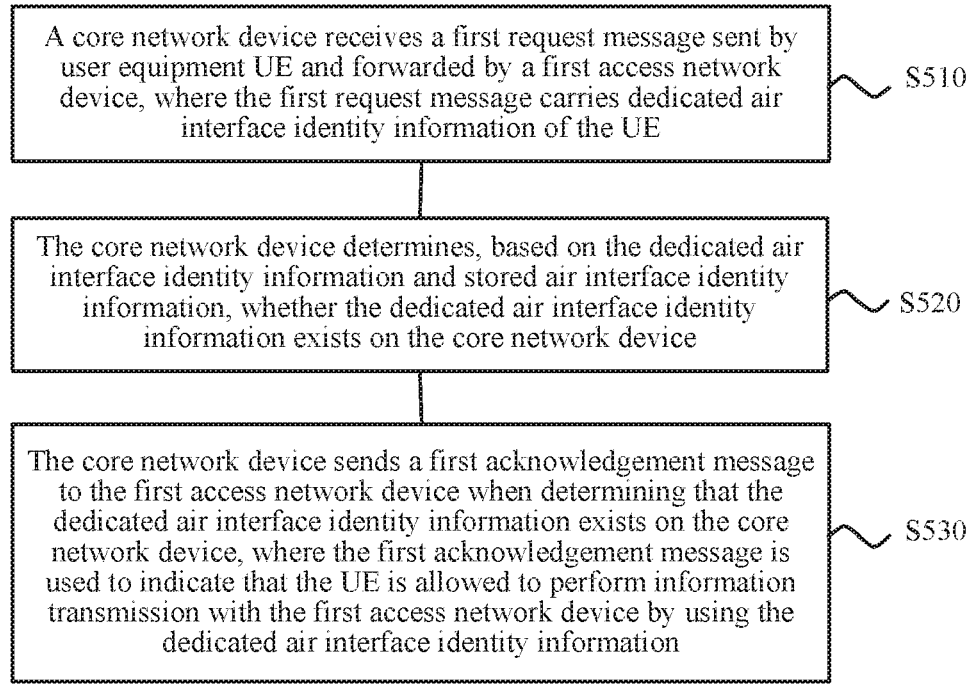
FIG. 6 is still another schematic block diagram of an information transmission method according to an embodiment of the present disclosure.

The following describes, with reference to FIG. 4 to FIG. 6, an information transmission method according to an embodiment of the present disclosure from the perspective of user equipment, an access network device, and a core network device.

FIG. 4 is a schematic block diagram of an information transmission method 300 according to an embodiment of the present disclosure. The method 300 may be performed by a terminal device, for example, by user equipment. As shown in FIG. 4, the method 300 includes:

S310: User equipment UE determines, when the UE is in an idle state, whether there is to-be-transmitted uplink information.

S320: The UE sends a first request message to a first access network device when the UE determines that there is to-be-transmitted uplink information, where the first request message is a first air interface message for the UE to switch from the idle state to a connected state, and the first request message carries uplink non-access stratum NAS information and air interface identity information that is stored on the UE.

Specifically, for example, in an LTE system, when UE is in an idle state, to save resources and a quantity of electricity of the user equipment, a bearer between the network device and the UE for data transmission is deleted. In the prior art, when UE is in an idle mode, if a NAS (non-access stratum) of the UE requests to establish a signaling connection, the UE initiates an RRC connection establishment request process. This process includes at least five steps, to be specific, at least five air interface messages are transmitted. In this embodiment of the present disclosure, however, when the UE is in the idle mode, if the NAS (non-access stratum) of the UE requests to establish a signaling connection, the UE directly adds NAS information to the first air interface message. The NAS information cannot be decoded on an air interface. In other words, an access network device cannot obtain the NAS information such as a type or content. In addition, by storing the air interface identity information, the UE can send uplink information without negotiating with a base station for air interface identity information when waking up from the idle state, thereby further reducing overheads of air interface signaling.

Therefore, according to the information transmission method provided in this embodiment of the present disclosure, when the user equipment enters the connected state from the idle state, the first air interface message is sent to the first access network device by using the air interface identity information that is stored on the UE, and the NAS information is directly carried in the first air interface message. In this way, the user equipment can rapidly access an access network device and a core network device, thereby reducing overheads of air interface signaling.

An entire network system (Evolved Packet System, EPS) includes two management models: mobility management (EPS mobility management, EMM) and connection management (EPS Connection Management, ECM). An EMM state describes a registration state of the UE in a network, indicating whether the UE is registered with the network. Changing of the registration state is caused by a mobility management process, for example, an attach process. EMM is divided into a registered state and an unregistered state. EMC describes a signaling connection between UE and a core network and also has two states: an idle state and a connected state. The idle state and the connected state are two states on an RRC sublayer, and the connected state indicates establishment of an RRC connection, and the idle state indicates release of an RRC connection. In this embodiment of the present disclosure, both the unregistered state and the RRC idle state may be the idle state.

In this application, the air interface identity information refers to a network identity of the UE. The network identity may be a permanent identity allocated by a server to the UE, that is, an international mobile subscriber identity (IMSI), or may be a dynamic identity allocated by the network device to the UE, that is, a cell radio network temporary identity (C-RNTI) that uniquely identifies UE on an air interface of a cell, or may be a fixed RNTI reserved by a base station for the UE before the UE registers. The fixed RNTI may correspond to a plurality of UEs in a cell in which the UE is currently located. The air interface identity information is not limited in the present disclosure, and any air interface identity information capable of uniquely identifying the UE in an air interface message transmission process can be used.

In a possible implementation of the present disclosure, the uplink NAS information includes an attach request message, and before the UE determines whether there is to-be-transmitted uplink information, the method further includes: storing, by the UE, air interface identity information that is pre-allocated by the first access network device to the UE before the UE performs an attach process, where the air interface identity information corresponds to at least one UE that communicates with the first access network device.

By storing, before the UE performs the attach process, the air interface identity information obtained through negotiation between the UE and the first access network device, the attach request message can be carried in the first air interface message. The pre-allocated air interface identity information may be stored in the UE in advance through negotiation between the core network device and the UE. A source of the pre-allocated air interface identity information is not limited in this embodiment of the present disclosure.

Further, the UE may receive a response message sent by the first access network device. The response message is used to indicate whether the UE is allowed to perform an attach process.

Specifically, the UE receives a response message or an access rejection message sent by the first access network device. For example, after the UE finishes sending the first request message, the UE listens to the response message/the access rejection message on the air interface. The response message/the access rejection message carries NAS information of the UE sent by the core network device. The UE may first parse the NAS information. If the parsed NAS information belongs to the UE, the UE may determine that the UE is to be scheduled by the core network device. The UE may further determine that the NAS information is a response message. In this case, the UE may learn that dedicated air interface identity information carried in the NAS information is for the UE, and may use the dedicated air interface identity information as identity information used for subsequent communication on the air interface. If the UE determines that the NAS information is an access rejection message, the UE may learn that the NAS request initiated by the UE to establish a signaling connection fails and may learn a rejection cause.

Preferably, the UE stores the dedicated air interface identity information allocated by the core network device or the access network device, so that when the UE wakes up from the idle state again, the UE directly broadcasts by using the air interface identity information.

Optionally, the response message or the access rejection message may be a response to the attach request message, or may be a response to whether load of the first access network device allows.

In another possible implementation of the present disclosure, the uplink NAS information includes NAS data, and before the UE determines whether there is to-be-transmitted uplink information, the method further includes: receiving, by the UE, dedicated air interface identity information sent by the first core network device, where the dedicated air interface identity information is allocated by the core network device or the first access network device to the UE; and storing, by the UE, the dedicated air interface identity information.

By storing the dedicated air interface identity information allocated by the network device to the UE, when the UE wakes up from the idle state again, the UE directly uses the dedicated air interface identity information to send uplink data, thereby further reducing overheads of air interface signaling.

Accordingly, the UE may further receive a response message sent by the first core network device. The response message is used to indicate that the NAS data is legal or load can bear the UE.

Alternatively, the UE may receive an access rejection message sent by the first core network device. The access rejection message is used to indicate that the NAS data is illegal or load cannot bear the UE.

For example, after the UE finishes sending the first request message, the UE listens to a response message or an access rejection message on the air interface. If a response message is found, the UE continues to use the dedicated air interface identity information to transmit uplink data. If an access rejection message is found, the UE obtains a failure cause.

Optionally, before the UE receives the dedicated air interface identity information sent by the first core network device, the method includes: sending a fourth request message to the first access network device. The fourth request message is a first air interface message used for switching from an idle state to a connected state. The fourth request message carries an attach request message and the air interface identity information pre-allocated by the first access network device to the UE, to facilitate allocation of dedicated air interface identity information by the network device for the UE.

Optionally, the UE can listen to a system broadcast message when waking up from the idle state. If finding that a current ECI, that is, at least one of an eNB eNB ID and a cell Cell ID is changed, the UE sends data by using air interface identity information obtained in advance through negotiation between a current cell and the UE, and generates indication information for updating of an ECI and sends the indication information to the base station. The indication information carries the old ECI and dedicated air interface identity information of the UE on an old access network device. For example, the UE may use an algorithm to convert an eNB ID+a Cell ID into an ECI, for example, convert an eNB ID into 13432A in a hexadecimal system, and then add a Cell ID behind 13432A to obtain 13432A01, and then convert 13432A01 into an ECI in a decimal system. The access network device may further calculate ECIs in advance by using various combinations of eNB IDs and Cell IDs and store the ECIs in a configuration table in the access network device. During use, the UE only needs to perform comparison.

In this application, the indication information may be NAS identity information, or may be an eNB ID+a Cell ID of an old access network device. In this case, this solution is applied to old dedicated air interface identity information previously stored by the UE, and the UE may determine the UE based on the NAS identity information or the ECI of the old access network device. This solution may further be applied to old dedicated air interface identity information that is not previously stored on the UE. In other words, when the UE wakes up from the idle state and finds that an idle state is switched to a state of communicating with an access network device, the UE may send the first request message by using fixed air interface identity information obtained in advance through negotiation between the current access network device and the UE. The first request message may carry fixed air interface identity information and NAS data. The fixed air interface identity information is used to indicate that the UE is switched from an idle state to a state of communication with an access network device. The fixed air interface identity information may further be considered as indication information.

Therefore, according to the information transmission method provided in this embodiment of the present disclosure, when the user equipment enters the connected state from the idle state, the first air interface message is sent to the first access network device by using the air interface identity information that is stored on the UE, and the NAS information is directly carried in the first air interface message. In this way, the user equipment can rapidly access an access network device and a core network device, thereby reducing overheads of air interface signaling. Furthermore, the UE stores the dedicated air interface identity information allocated by the network device to the UE, so that when the UE wakes up from the idle state again, the UE directly uses the dedicated air interface identity information to send uplink data, thereby further reducing overheads of air interface signaling.

FIG. 5 is a schematic block diagram of an information transmission method 400 according to an embodiment of the present disclosure. The method 400 may be performed by an access network device, for example, by a base station. As shown in FIG. 5, the method 400 includes:

S410: A first access network device receives a first request message sent by user equipment UE, where the first request message is a first air interface message for the UE to switch from an idle state to a connected state, the first request message carries an attach request message and air interface identity information that is pre-allocated by the first access network device to the UE before the UE performs an attach process, and the air interface identity information corresponds to at least one UE that communicates with the first access network device.

S420: The first access network device obtains dedicated air interface identity information of the UE based on the first request message.

S430: The first access network device sends the dedicated air interface identity information of the UE to the UE.

Specifically, after receiving the first request message sent by the UE, the first access network device first decodes a type of an air interface message. After determining that the air interface message is a first air interface message of the UE not registered with a core network, the first access network device obtains dedicated air interface identity information of the UE. The dedicated air interface identity information may be allocated by the first access network device or a core network device. Finally, the first access network device sends the obtained dedicated air interface identity information to the UE.

Therefore, according to the information transmission method in this embodiment of the present disclosure, when the user equipment is switched from the idle state to the connected state, by directly carrying the NAS information in the first air interface message, the user equipment can rapidly establish a NAS signaling connection, thereby reducing overheads of air interface signaling.

A person skilled in the art understands that, after receiving the first request message, the access network device first needs to determine whether new UE is allowed to access the access network device. The network device is responsible for managing resource scheduling of an uplink channel, to be specific, in a system resource allocation process, determines a time point and resources that can be used by the user equipment for data transmission. For example, the UE requests an uplink resource from the access network device. According to an upper layer configuration, the UE transmits a periodic scheduling request (SR) by using an uplink control message according to a particular period and a subframe position. That is, when the UE needs to send data, a corresponding SR is set to 1. When there is no resource request, an SR is set to be empty and is not in a form of a packet. The SR is only responsible for informing the access network device of whether there is a resource requirement, and the access network device is informed of a specific quantity of required resources through subsequent signaling interaction. Then, the access network device measures quality of the uplink channel. Before allocating an uplink resource to the UE, the access network device first needs to know the quality of the uplink channel. If the quality of the uplink channel of the UE is relatively good and there is a data transmission requirement, the access network device allocates a resource to the UE. For example, the access network device may determine load information of a current access network. For example, the access network device may determine the load information of the current access network based on information such as a data packet loss ratio and a transmission delay, for example, determine that the current access network is in a heavy congestion state, a medium congestion state, or a low congestion state. However, the present disclosure is not limited thereto. When determining that new UE can be borne, the access network device forwards NAS information carried in the first request message to the core network device. If determining that new UE cannot be borne, the access network device directly deletes the NAS information and sends an access failure message on the air interface.

In a possible implementation of the present disclosure, the first access network device allocates the dedicated air interface identity information to the UE based on the first request message. Specifically, the first access network device may determine, based on the received first request message, that the first request message is first air interface message after the UE is powered on for the first time, and allocate the dedicated air interface identity information to the UE. The first access network device may further send a second request message to the core network device on an S1 interface. The second request message may carry the attach request message and the dedicated air interface identity information allocated by the first access network device.

In another possible implementation of the present disclosure, the obtaining, by the first access network device, a dedicated air interface identity of the UE based on the first request message includes: sending, by the first access network device, a third request message to a core network device, where the third request message carries the attach request message; receiving, by the first access network device, an acknowledgement message sent by the core network device, where the acknowledgement message carries the dedicated air interface identity information; and obtaining, by the first access network device, the dedicated air interface identity information of the UE from the acknowledgement message.

Further, the sending the dedicated air interface identity information to the UE includes: sending, by the first access network device, a response message to the UE, where the response message carries attach success indication information and the dedicated air interface identity information.

Specifically, the first access network device may send a response message to the UE, and the response message carries the attach success indication information and the dedicated air interface identity information. The downlink NAS information includes NAS identity information of the UE. Alternatively, the first access network device may send a response message to the UE, the response message is used to indicate that data sent by the UE is legal, and the response message may carry downlink NAS data.

For example, if the user equipment is to perform an attach process, when determining, based on a type of a NAS message, that an attach request message is received, the core network device may authenticate the UE based on a NAS identity such as international mobile subscriber identity (international mobile subscriber identity, IMSI) or an international mobile equipment identity (International Mobile Equipment Identity, IMEI). In this way, the core network device may determine whether to allow the user to perform an attach process. If allowing the user to perform an attach process, the attach process is performed and a response message is sent. The response message carries NAS attach success indication information and the dedicated air interface identity information. If not allowing the user to perform an attach process, an access rejection message is sent. The access rejection message carries NAS attach rejection information. The access network device sends, based on the received response message or access rejection message by using a response message on the air interface, the NAS message carried in the received response message or access rejection message. If the response message is received, the dedicated air interface identity information is carried in the message. If the access rejection message is received, a rejection cause is included in the message.

Therefore, according to the information transmission method provided in this embodiment of the present disclosure, when the user equipment enters the connected state from the idle state, the first air interface message is sent to the first access network device by using the air interface identity information that is stored on the UE, and the NAS information is directly carried in the first air interface message. In this way, the user equipment can rapidly access an access network device and a core network device, thereby reducing overheads of air interface signaling. Furthermore, the UE stores the dedicated air interface identity information allocated by the network device to the UE, so that when the UE wakes up from the idle state again, the UE directly uses the dedicated air interface identity information to send uplink data, thereby further reducing overheads of air interface signaling.

FIG. 6 is a schematic block diagram of an information transmission method 500 according to an embodiment of the present disclosure. The method 500 may be performed by a core network device, for example, by a mobility management entity (MME). As shown in FIG. 6, the method 500 includes:

S510: A core network device receives a first request message sent by user equipment UE and forwarded by a first access network device, where the first request message carries NAS data and dedicated air interface identity information of the UE.

S520: The core network device determines, based on the dedicated air interface identity information and stored air interface identity information, whether the dedicated air interface identity information exists on the core network device.

S530: The core network device sends a first acknowledgement message to the first access network device when determining that the dedicated air interface identity information exists on the core network device, where the first acknowledgement message is used to indicate that the UE is allowed to perform information transmission with the first access network device by using the dedicated air interface identity information.

Specifically, the core network device stores the air interface identity information for transmitting an air interface message, so that when the UE requests a NAS to establish a signaling connection, the core network device compares the received dedicated air interface identity information and the stored air interface identity information. If the received dedicated air interface identity information and the stored air interface identity information are the same, it indicates that the dedicated air interface identity information exists. In other words, the UE can perform subsequent information transmission by using the dedicated air interface identity information.

Therefore, according to the information transmission method in this embodiment of the present disclosure, the core network device manages the air interface identity information. When the user equipment is switched from an idle state to a connected state, the UE does not need to negotiate, every time the user equipment wakes up from the idle state, with the access network device on an air interface about an air interface identity on an air interface, thereby reducing overheads of air interface signaling. In addition, it can be avoided that reallocation needs to be performed because an air interface identity of the user equipment cannot be identified when the access network device restarts.

In a possible implementation of the present disclosure, before the receiving, by a core network device, a first request message sent by user equipment UE and forwarded by a first access network device, the method further includes: receiving, by the core network device, a second request message sent by the first access network device, where the second request message carries an attach request message and the dedicated air interface identity information; and storing, by the core network device, the dedicated air interface identity information after determining that the UE is successfully attached.

Specifically, before receiving the first request message forwarded by the first access network device, the core network device receives, when the UE registers with the core network device, a second request message forwarded by the first access network device. The second request message carries an attach request message. The first access network device allocates the dedicated air interface identity information to the UE based on the second request message and sends the dedicated air interface identity information to the core network device. The core network device first determines, based on the attach request message, whether to allow the UE to perform an attach process. If allowing the UE to perform an attach process, the core network device stores the dedicated air interface identity information after the UE is successfully attached. Alternatively, the core network device may first store the dedicated air interface identity information and then an attach process is performed. A sequence of the procedure is not limited in this embodiment of the present disclosure.

In another possible implementation of the present disclosure, before the receiving, by a core network device, a first request message sent by user equipment UE and forwarded by a first access network device, the method further includes: receiving, by the core network device, a third request message sent by the UE and forwarded by the first access network device, where the third request message carries an attach request message; allocating, by the core network device, dedicated air interface identity information to the UE after determining that the UE is successfully attached, sending, by the core network device, a second acknowledgement message to the first access network device, where the second acknowledgement message is used to indicate that the UE is successfully attached, and the second acknowledgement message carries the dedicated air interface identity information; and, storing, by the core network device, the dedicated air interface identity information.

Specifically, after determining that the UE performs the attach process and the UE is successfully attached, the core network device allocates the dedicated air interface identity information to the UE, stores the dedicated air interface identity information, and sends the dedicated air interface identity information to the UE, so that the UE performs subsequent air interface communication by using the dedicated air interface identity information.

Optionally, the method further includes: receiving, by the core network device, indication information sent by the first access network device, where the indication information is used to indicate that the access network device communicating with the UE has been switched from a second access network device to the first access network device; allocating, by the core network device based on the indication information, dedicated air interface identity information that corresponds to the first access network device to the UE; changing, by the core network device, the stored air interface identity information from dedicated air interface identity information of the UE corresponding to the second access network device to the dedicated air interface identity information of the UE corresponding to the first access network device; and sending, by the core network device to the first access network device, the dedicated air interface identity information of the UE corresponding to the first access network device.

Specifically, the UE listens to a system broadcast message when waking up from the idle state. If finding that a current ECI is changed, the UE sends data by using air interface identity information currently obtained in advance through negotiation with a current access network device and generates indication information. The indication information may include an old ECI and old dedicated air interface identity information. After receiving the indication information, the access network device sends the indication information to the core network device on an S1 interface. The core network device may find the UE based on the old ECI and the old dedicated air interface identity information carried in the indication information, allocate new dedicated air interface identity information to the UE on the current access network device, and send the new dedicated air interface identity information to the current access network device on the S1 interface. The current access network device sends, to the UE on an air interface by using a feedback message, the new dedicated air interface identity information allocated by the core network device. After receiving the message, the UE obtains the new dedicated air interface identity information in the message and uses the new dedicated air interface identity information as identity information for subsequent air interface communication. The core network device may further instruct an old access network device to release related information of the UE, for example, a context of the UE. A person skilled in the art should understand that, a solution used by a core network device to determine replacement of an access network device is not limited in this embodiment of the present disclosure.

It should be further understood that sequence numbers of the foregoing processes do not indicate execution sequences in various embodiments of the present disclosure. The execution sequences of the processes should be determined based on functions and internal logic of the processes, and should not be construed as any limitation on the implementation processes of the embodiments of the present disclosure.

Figure 7:
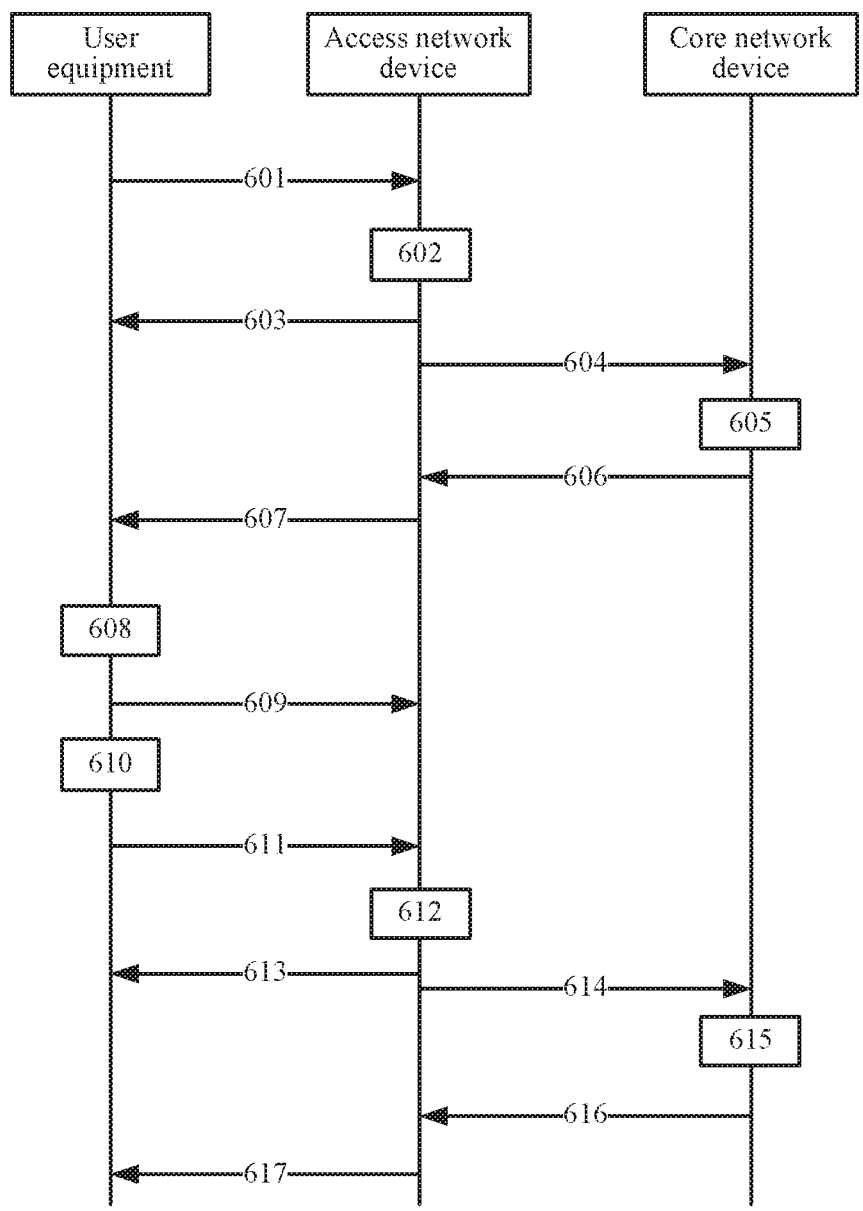
FIG. 7 is still another schematic block diagram of an information transmission method according to an embodiment of the present disclosure.

The following describes an information transmission method 600 according to an embodiment of the present disclosure in detail with reference to FIG. 7 and from the perspective of interaction between user equipment, an access network device, and a core network device. As shown in FIG. 7, the method 600 includes the following steps.

S601: UE is powered on for the first time and needs to perform an attach process to register with a core network. The UE sends a first request message to the access network device. The first request message is a first air interface message for the UE to switch from an idle state to a connected state, and the first request message carries an attach request message and a fixed ID obtained through negotiation between an access network device and the UE.

S602: The access network device determines, based on the first request message, whether load can accept. If the load cannot accept, the access network device deletes NAS information that is carried and performs step S603. If the load can accept, step S604 is performed.

S603. The access network device sends an access rejection message to the UE. The rejection message carries the fixed ID and a rejection cause.

S604: The access network device forwards the attach request message to a core network device.

Specifically, the network device is responsible for managing resource scheduling of an uplink channel, to be specific, in a system resource allocation process, determining a time point and resources that can be used by the user equipment for data transmission. For example, the UE requests an uplink resource from the access network device. According to an upper layer configuration, the UE sends a periodic scheduling request (SR) by using an uplink control message according to a particular period and a subframe position. That is, when the UE needs to send data, a corresponding SR is set to 1. When there is no resource request, an SR is empty and is not in a form of a packet. The SR is only responsible for informing the access network device of whether there is a resource requirement, and the access network device is informed of a specific quantity of required resources through subsequent signaling interaction. Then, the access network device measures quality of the uplink channel. Before allocating an uplink resource to the UE, the access network device first needs to know the quality of the uplink channel. If the quality of the uplink channel of the UE is relatively good and there is a data transmission requirement, the access network device allocates a resource to the UE.

S605: The core network device authenticates the UE based on NAS identity information in the received attach request message, and allocates dedicated air interface identity information to the UE and stores the dedicated air interface identity information if the authentication succeeds.

S606: If the core network device allows the user equipment to perform an attach process, after the user equipment is successfully attached, the UE sends an access success message to the access network device. The access success message carries NAS attach success information and carries the dedicated air interface identity information allocated by the core network device to serve as subsequent air interface identity information. If the core network device does not allow the UE to perform the attach process, the core network device sends an access failure message to the access network device. The access failure message carries NAS attach rejection information, and a rejection cause is included in the attach rejection message.

S607: The access network device sends NAS information carried in a received response message to the user equipment. If the response message is an access success message and the access success message carries attach acceptance information, the access network device may send the response message to the user equipment by using the dedicated air interface identity information allocated by the core network device. If the response message is an access rejection message and the access rejection message carries attach rejection information, the access network device sends the access rejection message to the user equipment by using a fixed ID.

S608: The user equipment needs to parse the received response message and determine, based on the parsed NAS information, whether the UE is UE scheduled by the core network device. If the UE is not UE scheduled by the core network device, the access fails. If the UE is UE scheduled by the core network device, proceed to step S609.

S609: When the UE determines that the UE is user equipment scheduled by the core network device and there is to-be-transmitted uplink information, the user equipment sends the to-be-transmitted uplink information to the access network device by using the dedicated air interface identity information allocated by the core network device.

S610: The UE stores the dedicated air interface identity information allocated by the core network device.

S611: The UE wakes up from the idle state and sends a second request message to the access network device. The second request message is a first air interface message for the UE to switch from an idle state to a connected state, and the second request message carries NAS data.

S612: Similarly, the access network device determines whether new UE can access. If no new UE is allowed to access, step S613 is performed. If new UE is allowed to access, step S614 is performed.

S613: The access network device sends a rejection message to the UE. The rejection message carries the dedicated air interface identity information and a rejection cause.

S614: The access network device forwards the NAS data and the dedicated air interface identity information to the core network device.

S615: The core network device determines, based on the received dedicated air interface identity information and the stored air interface identity information, whether the dedicated air interface identity information exists.

S616: If determining that the dedicated air interface identity information exists, the core network device sends a response message to the access network device to inform the access network device that the dedicated air interface identity information may continue to be used to transmit data. If determining that the dedicated air interface identity information does not exist, the core network device may discard the NAS data and inform the access network device that the dedicated air interface identity information cannot be used.

S617: After receiving the response message, the access network device may transmit downlink data by using the dedicated air interface identity information or send a connection release message to the UE.

Therefore, according to the information transmission method provided in this embodiment of the present disclosure, when the user equipment enters the connected state from the idle state, the first air interface message is sent to the first access network device by using the air interface identity information that is stored on the UE, and the NAS information is directly carried in the first air interface message. In this way, the user equipment can rapidly access an access network device and a core network device, thereby reducing overheads of air interface signaling. Furthermore, the UE stores the dedicated air interface identity information allocated by the network device to the UE, so that when the UE wakes up from the idle state again, the UE directly uses the dedicated air interface identity information to send uplink data, thereby further reducing overheads of air interface signaling.

In addition, in the method embodiments, steps on a UE side may be separately implemented as an information transmission method on the UE side, steps on an access network side may be separately implemented as an information transmission method on the access network side, and steps on a core network side may be separately implemented as an information transmission method on the core network side. In the method embodiments, an access network is usually a base station, and a core network is usually a mobility management entity.

The foregoing describes in detail, with reference to FIG. 3 to FIG. 7, the information transmission method according to the embodiments of the present disclosure. The following describes apparatus embodiments of the present disclosure that can be used to perform the method embodiments of the present disclosure. For details not disclosed in the apparatus embodiments of the present disclosure, refer to the method embodiments of the present disclosure.

Figure 8:
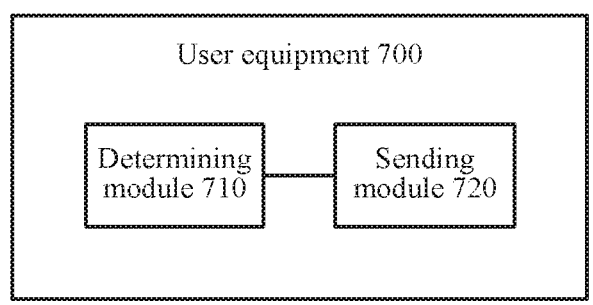
FIG. 8 is a schematic block diagram of user equipment according to an embodiment of the present disclosure.

FIG. 8 is a schematic block diagram of user equipment 700 according to an embodiment of the present disclosure. As shown in FIG. 8, the user equipment 700 includes: a determining module 710, configured to determine, when the user equipment UE is in an idle state, whether there is to-be-transmitted uplink information; and a sending module 720, configured to send a first request message to a first access network device when the UE determines that there is to-be-transmitted uplink information, where the first request message is a first air interface message for the UE to switch from the idle state to a connected state, and the first request message carries uplink non-access stratum NAS information and air interface identity information that is stored on the UE.

Specifically, for example, in an LTE system, when UE is in an idle state, to save resources and a quantity of electricity of the user equipment, a bearer between the network device and the UE for data transmission is deleted. In the prior art, when UE is in an idle mode, if a NAS (non-access stratum) of the UE requests to establish a signaling connection, the UE initiates an RRC connection establishment request process. This process includes at least five steps, to be specific, at least five air interface messages are transmitted. In this embodiment of the present disclosure, however, when the UE is in the idle mode, if the NAS (non-access stratum) of the UE requests to establish a signaling connection, the UE directly adds NAS information to the first air interface message. The NAS information cannot be decoded on an air interface. In other words, an access network device cannot obtain the NAS information such as a type or content. In addition, by storing the air interface identity information, the UE can send uplink information without negotiating with the base station for air interface identity information when waking up from the idle state, thereby further reducing overheads of air interface signaling.

Therefore, according to the user equipment in this embodiment of the present disclosure, when the user equipment is switched from the idle state to the connected state, by directly carrying the NAS information in the first air interface message, the user equipment can rapidly establish a NAS signaling connection, thereby reducing overheads of air interface signaling.

Optionally, in this embodiment of the present disclosure, the uplink NAS information includes an attach request message, and the user equipment 700 further includes:

a first storage module 730, configured to store air interface identity information that is pre-allocated by the first access network device to the UE before the UE performs an attach process, where the air interface identity information corresponds to at least one UE that communicates with the first access network device.

Optionally, the user equipment 700 further includes:

a first receiving module 740, configured to receive a response message sent by the first access network device, where the response message carries attach success indication information and dedicated air interface identity information of the UE, and the dedicated air interface identity information is allocated by the core network device or the first access network device to the UE.

The first storage module 730 is further configured to:

store the dedicated air interface identity information; and send the air interface message to the access network device by using the second air interface identity information.

Optionally, the uplink NAS information includes NAS data, and the user equipment 700 further includes:

a second receiving module 750, configured to receive dedicated air interface identity information sent by the first core network device, where the dedicated air interface identity information is allocated by the core network device or the first access network device to the UE; and a second storage module 760, configured to store the dedicated air interface identity information.

Optionally, the uplink NAS information includes NAS data, and the sending module 720 is specifically configured to:

send the first request message to the first access network device when the UE determines that an access network device communicating with the UE is witched to the first access network device, where the first request message further carries indication information, and the indication information is used to indicate that the access network device communicating with the UE has been switched.

It should be understood that, the user equipment 700 according to this embodiment of the present disclosure may correspond to an execution body of the information transmission method 300 of the embodiments of the present disclosure, and the foregoing and other operations and/or functions of the modules of the user equipment 700 are to implement corresponding procedures of the methods in FIG. 3, FIG. 4, and FIG. 7. For brevity, details are not repeatedly described herein.

Therefore, for the user equipment according to this embodiment of the present disclosure, when the user equipment enters the connected state from the idle state, the first air interface message is sent to the first access network device by using the air interface identity information that is stored on the UE, and the NAS information is directly carried in the first air interface message. In this way, the user equipment can rapidly access an access network device and a core network device, thereby reducing overheads of air interface signaling. In addition, the UE stores the dedicated air interface identity information allocated by the network device to the UE, so that when the UE wakes up from the idle state again, the UE directly uses the dedicated air interface identity information to send uplink data, thereby further reducing overheads of air interface signaling.

Figure 9:
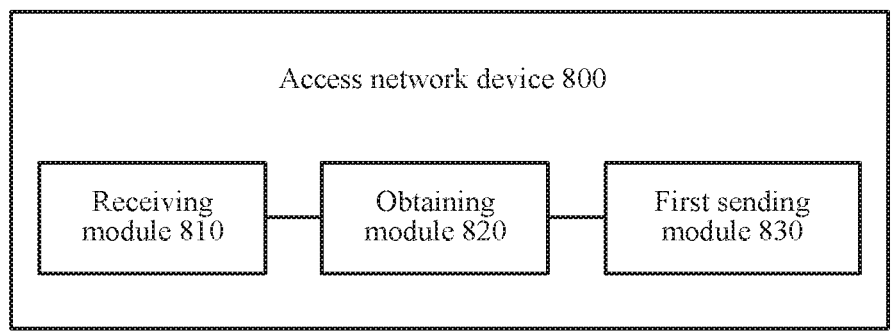
FIG. 9 is a schematic block diagram of an access network device according to an embodiment of the present disclosure.

FIG. 9 is a schematic block diagram of an access network device 800 according to an embodiment of the present disclosure. As shown in FIG. 9, the access network device 800 includes:

a receiving module 810, configured to receive a first request message sent by user equipment UE, where the first request message is a first air interface message for the UE to switch from an idle state to a connected state, the first request message carries an attach request message and air interface identity information that is pre-allocated by the first access network device to the UE before the UE performs an attach process, and the air interface identity information corresponds to at least one UE that communicates with the first access network device;

an obtaining module 820, configured to obtain dedicated air interface identity information of the UE based on the first request message; and a sending module 830, configured to send dedicated air interface identity information of the UE to the UE.

Therefore, according to the access network device according to this embodiment of the present disclosure, when the user equipment is switched from the idle state to the connected state, by directly carrying the NAS information in the first air interface message, the user equipment can rapidly establish a NAS signaling connection, thereby reducing overheads of air interface signaling.

Optionally, the obtaining module 820 is specifically configured to: allocate the dedicated air interface identity information to the UE based on the first request message.

Optionally, the obtaining module 820 is specifically configured to:

send a third request message to a core network device, where the third request message carries the attach request message;

receive an acknowledgement message sent by the core network device, where the acknowledgement message carries the dedicated air interface identity information; and obtain the dedicated air interface identity information of the UE from the acknowledgement message.

Optionally, the sending module 830 is further configured to:

send a second request message to a core network device, where the second request message carries the attach request message and the dedicated air interface identity information.

Optionally, the access network device 800 further includes:

a determining module 840, configured to determine, based on the first request message, to allow the UE to access the first access network device.

Optionally, the sending module 830 is specifically configured to: send a response message to the UE, where the response message carries attach success indication information and the dedicated air interface identity information.

It should be understood that, the access network device 800 according to this embodiment of the present disclosure may correspond to an execution body of the information transmission method 400 of the embodiments of the present disclosure, and the foregoing and other operations and/or functions of the modules of the access network device 800 are to implement corresponding procedures of the methods in FIG. 3, FIG. 5, and FIG. 7. For brevity, details are not repeatedly described herein.

Therefore, according to the access network device according to this embodiment of the present disclosure, when the user equipment enters the connected state from the idle state, the first air interface message is sent to the first access network device by using the air interface identity information that is stored on the UE, and the NAS information is directly carried in the first air interface message. In this way, the user equipment can rapidly access an access network device and a core network device, thereby reducing overheads of air interface signaling. In addition, the UE stores the dedicated air interface identity information allocated by the network device to the UE, so that when the UE wakes up from the idle state again, the UE directly uses the dedicated air interface identity information to send uplink data, thereby further reducing overheads of air interface signaling.

Figure 10:
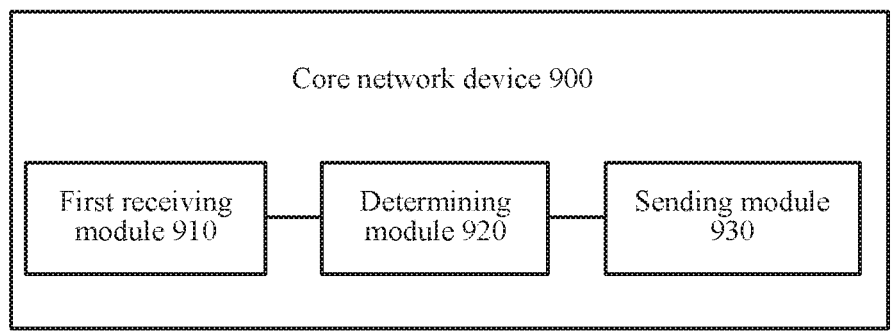
FIG. 10 is a schematic block diagram of a core network device according to an embodiment of the present disclosure.

FIG. 10 is a schematic block diagram of a core network device 900 according to an embodiment of the present disclosure. As shown in FIG. 10, the core network device 900 includes:

a receiving module 910, configured to receive a first request message sent by user equipment UE and forwarded by a first access network device, where the first request message carries dedicated air interface identity information of the UE;

a determining module 920, configured to determine, based on the dedicated air interface identity information and stored air interface identity information, whether the dedicated air interface identity information exists on the core network device; and a sending module 930, configured to send, by the core network device, a first acknowledgement message to the first access network device when it is determined that the dedicated air interface identity information exists on the core network device, where the first acknowledgement message is used to indicate that the UE is allowed to perform information transmission with the first access network device by using the dedicated air interface identity information.

Therefore, for the core network device according to this embodiment of the present disclosure, the core network device manages the air interface identity information. When the user equipment is switched from the idle state to the connected state, the UE does not need to negotiate, every time the user equipment wakes up from the idle state, with the access network device on an air interface about an air interface identity on an air interface. In addition, it can be avoided that reallocation needs to be performed because an air interface identity of the user equipment cannot be identified when the access network device restarts.

Optionally, the receiving module 910 is further configured to:

receive a second request message sent by the first access network device, where the second request message carries an attach request message and the dedicated air interface identity information.

The core network device 900 further includes:

a storage module 940, configured to store the dedicated air interface identity information after it is determined that the UE is successfully attached.

Optionally, the core network device 900 further includes:

an allocation module 950, configured to allocate the dedicated air interface identity information to the UE after it is determined that the UE is successfully attached.

The sending module 930 is further configured to:

send a second acknowledgement message to the first access network device, where the second acknowledgement message carries attach success indication information and the dedicated air interface identity information.

Optionally, the receiving module 910 is further configured to:

receive indication information sent by the first access network device, where the indication information is used to indicate that the access network device communicating with the UE has been switched from a second access network device to the first access network device.

The allocation module 950 is further configured to:

allocate, based on the indication information, dedicated air interface identity information that corresponds to the first access network device to the UE.

The core network device 900 further includes:

a replacement module 960, configured to change the stored air interface identity information from dedicated air interface identity information of the UE corresponding to the second access network device to the dedicated air interface identity information of the UE corresponding to the first access network device.

It should be understood that, the core network device 900 according to this embodiment of the present disclosure may correspond to an execution body of the information transmission method 500 of the embodiments of the present disclosure, and the foregoing and other operations and/or functions of the modules of the core network device 900 are to implement corresponding procedures of the methods in FIG. 3, FIG. 6, and FIG. 7. For brevity, details are not repeatedly described herein.

It should be noted that, when the apparatuses provided in the foregoing embodiments implement their functions, division of the foregoing functional units is merely used as an example for description. During actual application, the foregoing functions may be allocated to different functional units for implementation as required. That is, an internal structure of the device is divided into different functional units to implement all or some of the functions described above. In addition, the apparatus provided in the embodiments and the method embodiments have a same concept. For a specific implementation process, refer to the method embodiments. Details are not described herein again.

Figure 11:
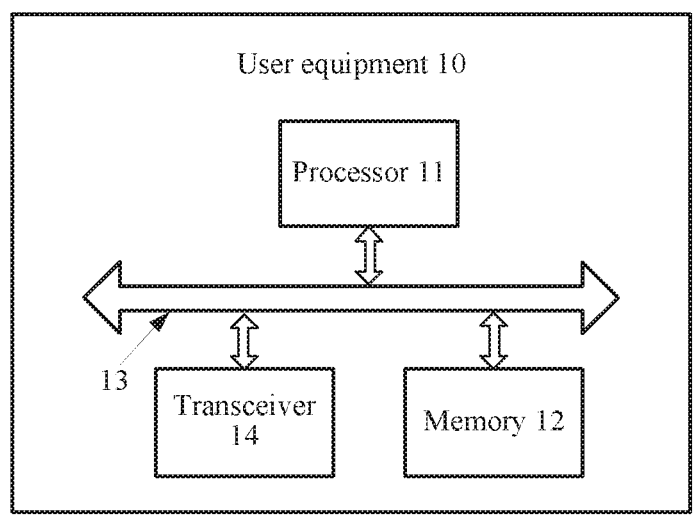
FIG. 11 is another schematic block diagram of user equipment according to an embodiment of the present disclosure.

As shown in FIG. 11, an embodiment of the present disclosure further provides user equipment 10. The mobility management network element 10 includes a processor 11, a memory 12, a bus system 13, and a transceiver 14. The processor 11, the memory 12, and the transceiver 14 are connected by using the bus system 13. The memory 12 is configured to store an instruction. The processor 11 is configured to: execute the instruction stored in the memory 12, and control the transceiver 14 to receive information. The processor 11 is configured to: determining, by user equipment UE when the UE is in an idle state, whether there is to-be-transmitted uplink information; and send a first request message to a first access network device when there is to-be-transmitted uplink information, where the first request message is a first air interface message for the UE to switch from the idle state to a connected state, and the first request message carries uplink non-access stratum NAS information and air interface identity information that is stored on the UE.

Specifically, for example, in an LTE system, when UE is in an idle state, to save resources and a quantity of electricity of the user equipment, a bearer between the network device and the UE for data transmission is deleted. In the prior art, when UE is in an idle mode, if a NAS (non-access stratum) of the UE requests to establish a signaling connection, the UE initiates an RRC connection establishment request process. This process includes at least five steps, to be specific, at least five air interface messages are transmitted. In this embodiment of the present disclosure, however, when the UE is in the idle mode, if the NAS (non-access stratum) of the UE requests to establish a signaling connection, the UE directly adds NAS information to the first air interface message. The NAS information cannot be decoded on an air interface. In other words, an access network device cannot obtain the NAS information such as a type or content. In addition, by storing the air interface identity information, the UE can send uplink information without negotiating with the base station for air interface identity information when waking up from the idle state, thereby further reducing overheads of air interface signaling.

Therefore, according to the user equipment in this embodiment of the present disclosure, when the user equipment is switched from the idle state to the connected state, by directly carrying the NAS information in the first air interface message, the user equipment can rapidly establish a NAS signaling connection, thereby reducing overheads of air interface signaling.

It should be understood that, in this embodiment of the present disclosure, the processor 11 may be a central processing unit (CPU). The processor 11 may further be another general-purpose processor, a digital signal processor (DSP), an application-specific integrated circuit (ASIC), a field programmable gate array (FPGA), or another programmable logic device, discrete gate or transistor logic device, or a discrete hardware component. The general-purpose processor may be a microprocessor or the processor may be any conventional processor, or the like.

The memory 12 may include a read-only memory and a random access memory, and provides the processor 11 with data and an instruction. A part of the memory 12 may further include a non-volatile random access memory. For example, the memory 12 may further store information about a device type.

In addition to a data bus, the bus system 13 may further include a power bus, a control bus, a status signal bus, and the like. However, for clarity of description, various buses are marked as the bus system 13 in the figure.

In an implementation process, each step of the foregoing method may be completed by using an integrated logical circuit of hardware in the processor 11 or an instruction in a form of software. The steps of the methods disclosed with reference to the embodiments of the present disclosure may be directly implemented by a hardware processor, or may be implemented by a combination of hardware and software modules of the processor. The software module may be located in a mature storage medium in the art, such as a random access memory, a flash memory, a read-only memory, a programmable read-only memory or electrically erasable programmable memory, or a register. The storage medium is located in the memory 12, and the processor 11 reads information in the memory 820 and completes the steps of the foregoing method in combination with the hardware of the processor 11. To avoid repetition, details are not described herein again.

Optionally, in an embodiment, the uplink NAS information includes an attach request message, and the processor 11 is further configured to:

store air interface identity information that is pre-allocated by the first access network device to the UE before the UE performs an attach process, where the air interface identity information corresponds to at least one UE that communicates with the first access network device.

Optionally, the processor 11 is further configured to:

receive a response message sent by the first access network device, where the response message carries attach success indication information and dedicated air interface identity information of the UE, and the dedicated air interface identity information is allocated by the core network device or the first access network device to the UE; and store the dedicated air interface identity information, and perform information transmission with the UE by using the dedicated air interface identity information.

Optionally, in an embodiment, the uplink NAS information includes NAS data, and the processor 11 is further configured to:

receive dedicated air interface identity information sent by the first core network device, where the dedicated air interface identity information is allocated by the core network device or the first access network device to the UE; and store the dedicated air interface identity information.

Optionally, in an embodiment, the uplink NAS information includes NAS data, and the processor 11 is further configured to:

send the first request message to the first access network device when it is determined that an access network device communicating with the UE has been switched to the first access network device, where the first request message further carries indication information, and the indication information is used to indicate that the access network device communicating with the UE has been switched.

It should be understood that, the user equipment 10 according to this embodiment of the present disclosure may correspond to an execution body of the information transmission method 300 of the embodiments of the present disclosure, and may correspond to the user equipment 700 according to this embodiment of the present disclosure, and the foregoing and other operations and/or functions of the modules of the mobility management network element 10 are to implement corresponding procedures of the methods in FIG. 3, FIG. 4, and FIG. 7. For brevity, details are not repeatedly described herein.

Figure 12:
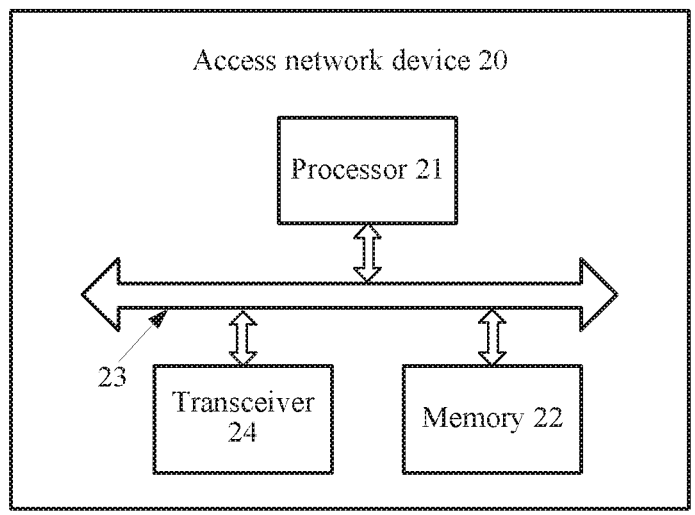
FIG. 12 is another schematic block diagram of an access network device according to an embodiment of the present disclosure.

As shown in FIG. 12, an embodiment of the present disclosure further provides an access network device 20. The network device 20 includes a processor 21, a memory 22, a bus system 23, and a transceiver 24. The processor 21, the memory 22, and the transceiver 24 are connected by using the bus system 23. The memory 22 is configured to store an instruction. The processor 21 is configured to: execute the instruction stored in the memory 22, and control the transceiver 24 to receive information. The processor 21 is configured to: receive a first request message sent by user equipment UE, where the first request message is a first air interface message for the UE to switch from an idle state to a connected state, the first request message carries an attach request message and air interface identity information that is pre-allocated by the first access network device to the UE before the UE performs an attach process, and the air interface identity information corresponds to at least one UE that communicates with the first access network device; obtain dedicated air interface identity information of the UE based on the first request message; and send the dedicated air interface identity information of the UE to the UE.

Therefore, according to the access network device in this embodiment of the present disclosure, when the user equipment is switched from the idle state to the connected state, by directly carrying NAS information in the first air interface message, the user equipment can rapidly establish a NAS signaling connection, thereby reducing overheads of air interface signaling.

It should be understood that, in this embodiment of the present disclosure, the processor 21 may be a central processing unit (Central Processing Unit, "CPU" for short). The processor 21 may further be another general-purpose processor, a digital signal processor (DSP), an application-specific integrated circuit (ASIC), a field programmable gate array (FPGA), or another programmable logic device, discrete gate or transistor logic device, or a discrete hardware component. The general-purpose processor may be a microprocessor or the processor may be any conventional processor, or the like.

The memory 22 may include a read-only memory and a random access memory, and provides the processor 21 with data and an instruction. A part of the memory 22 may further include a non-volatile random access memory. For example, the memory 22 may further store information about a device type.

In addition to a data bus, the bus system 23 may further include a power bus, a control bus, a status signal bus, and the like. However, for clarity of description, various buses are marked as the bus system 23 in the figure.

In an implementation process, each step of the foregoing method may be completed by using an integrated logical circuit of hardware in the processor 21 or an instruction in a form of software. The steps of the methods disclosed with reference to the embodiments of the present disclosure may be directly implemented by a hardware processor, or may be implemented by a combination of hardware and software modules of the processor. The software module may be located in a mature storage medium in the art, such as a random access memory, a flash memory, a read-only memory, a programmable read-only memory or electrically erasable programmable memory, or a register. The storage medium is located in the memory 22, and the processor 21 reads information in the memory 22 and completes the steps of the foregoing method in combination with the hardware of the processor 21. To avoid repetition, details are not described herein again.

Optionally, in an embodiment, the processor 21 is specifically configured to:

allocate the dedicated air interface identity information to the UE based on the first request message.

Optionally, the processor 21 is further configured to:

send a second request message to a core network device, where the second request message carries an attach request message and the dedicated air interface identity information.

Optionally, the processor 21 is specifically configured to:

send a third request message to a core network device, where the third request message carries the attach request message;

receive an acknowledgement message sent by the core network device, where the acknowledgement message carries the dedicated air interface identity information; and obtain the dedicated air interface identity information of the UE from the acknowledgement message.

Optionally, the processor 21 is further configured to: determine, based on the first request message, to allow the UE to access the first access network device.

Optionally, the processor 21 is further configured to:

send a response message to the UE, where the response message carries attach success indication information and the dedicated air interface identity information.

It should be understood that, the access network device 20 according to this embodiment of the present disclosure may correspond to an execution body of the information transmission method 400 of the embodiments of the present disclosure, and may correspond to the access network device 800 according to this embodiment of the present disclosure, and the foregoing and other operations and/or functions of the modules of the access network device 800 are to implement corresponding procedures of the methods in FIG. 3, FIG. 5, and FIG. 7. For brevity, details are not repeatedly described herein.

Figure 13:
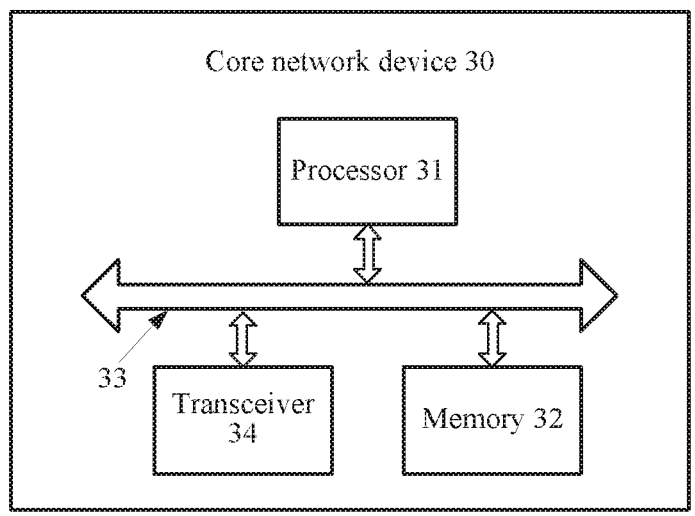
FIG. 13 is another schematic block diagram of a core network device according to an embodiment of the present disclosure.

As shown in FIG. 13, an embodiment of the present disclosure further provides a core network device 30. The core network device 30 includes a processor 31, a memory 32, a bus system 33, and a transceiver 34. The processor 31, the memory 32, and the transceiver 34 are connected by using the bus system 33. The memory 32 is configured to store an instruction. The processor 31 is configured to: execute the instruction stored in the memory 32, and control the transceiver 34 to receive information. The processor 31 is configured to: receive a first request message sent by user equipment UE and forwarded by a first access network device, where the first request message carries dedicated air interface identity information of the UE; determine, based on the dedicated air interface identity information and stored air interface identity information, whether the dedicated air interface identity information exists on the core network device; and send a first acknowledgement message to the first access network device when determining that the dedicated air interface identity information exists on the core network device, where the first acknowledgement message is used to indicate that the UE is allowed to perform information transmission with the first access network device by using the dedicated air interface identity information.

Therefore, for the core network device according to this embodiment of the present disclosure, the core network device manages the air interface identity information, so that it can be avoided that new air interface identity information needs to be obtained through signaling interaction again because air interface identity information cannot be identified by the access network device after the access network device restarts. This reduces overheads of air interface signaling.

It should be understood that, in this embodiment of the present disclosure, the processor 31 may be a central processing unit (CPU). The processor 31 may further be another general-purpose processor, a digital signal processor (DSP), an application-specific integrated circuit (ASIC), a field programmable gate array (FPGA), or another programmable logic device, discrete gate or transistor logic device, or a discrete hardware component. The general-purpose processor may be a microprocessor or the processor may be any conventional processor, or the like.

The memory 32 may include a read-only memory and a random access memory, and provides the processor 31 with data and an instruction. A part of the memory 32 may further include a non-volatile random access memory. For example, the memory 32 may further store information about a device type.

In addition to a data bus, the bus system 33 may further include a power bus, a control bus, a status signal bus, and the like. However, for clarity of description, various buses are marked as the bus system 33 in the figure.

In an implementation process, each step of the foregoing method may be completed by using an integrated logical circuit of hardware in the processor 31 or an instruction in a form of software. The steps of the methods disclosed with reference to the embodiments of the present disclosure may be directly implemented by a hardware processor, or may be implemented by a combination of hardware and software modules of the processor. The software module may be located in a mature storage medium in the art, such as a random access memory, a flash memory, a read-only memory, a programmable read-only memory or electrically erasable programmable memory, or a register. The storage medium is located in the memory 32, and the processor 31 reads information in the memory 32 and completes the steps of the foregoing method in combination with the hardware of the processor 31. To avoid repetition, details are not described herein again.

Optionally, in an embodiment, the processor 31 is further configured to:

receive a second request message sent by the first access network device, where the second request message carries an attach request message and the dedicated air interface identity information; and store the dedicated air interface identity information after it is determined that the UE is successfully attached.

Optionally, in an embodiment, the processor 31 is further configured to:

receive a third request message sent by the UE and forwarded by the first access network device, where the third request message carries an attach request message;

allocate the dedicated air interface identity information to the UE after it is determined that the UE is successfully attached;

send a second acknowledgement message to the first access network device, where the second acknowledgement message carries attach success indication information and the dedicated air interface identity information; and store the dedicated air interface identity information.

Optionally, in an embodiment, the processor 31 is specifically configured to:

receive indication information sent by the first access network device, where the indication information is used to indicate that the access network device communicating with the UE has been switched from a second access network device to the first access network device;

allocate, based on the indication information, dedicated air interface identity information that corresponds to the first access network device to the UE;

change the stored air interface identity information from dedicated air interface identity information of the UE corresponding to the second access network device to the dedicated air interface identity information of the UE corresponding to the first access network device; and send, to the first access network device, the dedicated air interface identity information of the UE corresponding to the first access network device.

It should be understood that, the core network device 30 according to this embodiment of the present disclosure may correspond to an execution body of the information transmission method 500 of the embodiments of the present disclosure, and may correspond to the core network device 900 according to this embodiment of the present disclosure, and the foregoing and other operations and/or functions of the modules of the core network device 30 are to implement corresponding procedures of the methods in FIG. 3, FIG. 6, and FIG. 7. For brevity, details are not repeatedly described herein.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present disclosure, "B corresponding to A" indicates that B is associated with A, and B may be determined based on A. However, it should also be understood that determining B according to A does not mean that B is determined according to A only, and B may also be determined according to A and/or other information.

It should be further understood that a singular form "one" ("a", "an", and "the") used in this specification is intended to further include a plural form unless the context clearly supports an otherwise case. It should be further understood that "and/or" used herein intends to include any and all possible combinations of one or more correlated items that are listed.

A person of ordinary skill in the art may be aware that, the units and steps in the examples described with reference to the embodiments disclosed herein may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division. During actual implementation. For example, a plurality of units or components may be combined or integrated into another system, or some features may be ignored or not performed. In addition, the displayed or discussed mutual couplings or direct couplings or communications connections may be implemented through some interfaces, and indirect couplings or communication connections between the apparatuses or units may be electrical connections, mechanical connections, or connections in other forms.

The units described as separate parts may or may not be physically separate, and parts displayed as units may or may not be physical units, may be located in one position, or may be distributed on a plurality of network units. A part or all of the units may be selected based on actual requirements to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of the present disclosure essentially, or the part contributing to the prior art, or all or a part of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any equivalent modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An information transmission method, comprising:
    determining, by user equipment (UE) when the UE is in an idle state, whether there is to-be-transmitted uplink information;
    sending, by the UE, a first request message to a first access network device when the UE determines that there is to-be-transmitted uplink information, wherein the first request message is a first air interface message for the UE to switch from the idle state to a connected state, and the first request message carries uplink non-access stratum (NAS) information, an attach request message and air interface and air interface identity information that is stored on the UE; and
    sending, by the first access network device, a third request message to a core network device, wherein the third request message carries the attach request message in the first request message;
    receiving, by the first access network device, an acknowledgement message sent by the core network device, wherein the acknowledgement message carries the dedicated air interface identity information; and
    obtaining, by the first access network device, the dedicated air interface identity information of the UE from the acknowledgement message.

2. The method according to claim 1, wherein the uplink NAS information comprises an attach request message, and before the UE determines whether there is to-be-transmitted uplink information, the method further comprises:
    storing, by the UE, air interface identity information that is pre-allocated by the first access network device to the UE before the UE performs an attach process, wherein the air interface identity information corresponds to at least one UE that communicates with the first access network device.

3. The method according to claim 2, further comprising:
receiving, by the UE, a response message sent by the first access network device, wherein the response message carries attach success indication information and dedicated air interface identity information of the UE, and the dedicated air interface identity information is allocated by the core network device or the first access network device to the UE; and
storing, by the UE, the dedicated air interface identity information, and performing information transmission with the first access network device by using the dedicated air interface identity information.

4. The method according to claim 1, wherein the uplink NAS information comprises NAS data, and before the UE determines whether there is to-be-transmitted uplink information, the method further comprises:
receiving, by the UE, dedicated air interface identity information sent by the core network device, wherein the dedicated air interface identity information is allocated by the core network device or the first access network device to the UE; and
storing, by the UE, the dedicated air interface identity information.

5. The method according to claim 1, wherein the uplink NAS information comprises NAS data, and sending, by the UE, the first request message to the first access network device comprises:
sending, by the UE, the first request message to the first access network device when the UE determines that an access network device communicating with the UE has been switched to the first access network device, wherein the first request message further carries indication information, and the indication information indicates that the access network device communicating with the UE has been switched.

6. An information transmission method, comprising:
receiving, by a first access network device, a first request message sent by user equipment (UE), wherein the first request message is a first air interface message for the UE to switch from an idle state to a connected state, the first request message carries an attach request message and air interface identity information that is pre-allocated by the first access network device to the UE before the UE performs an attach process, and the air interface identity information corresponds to at least one UE that communicates with the first access network device;
obtaining, by the first access network device, dedicated air interface identity information of the UE based on the first request message; and
sending, by the first access network device, the dedicated air interface identity information of the UE to the UE; and, wherein obtaining, by the first access network device, the dedicated air interface identity of the UE based on the first request message comprises:
sending, by the first access network device, a third request message to a core network device, wherein the third request message carries the attach request message;
receiving, by the first access network device, an acknowledgement message sent by the core network device, wherein the acknowledgement message carries the dedicated air interface identity information; and obtaining, by the first access network device, the dedicated air interface identity information of the UE from the acknowledgement message.

7. The method according to claim 6, wherein obtaining, by the first access network device, dedicated air interface identity information of the UE based on the first request message comprises:
allocating, by the first access network device, the dedicated air interface identity information to the UE based on the first request message.

8. The method according to claim 7, further comprising:
sending, by the first access network device, a second request message to a core network device, wherein the second request message carries the attach request message and the dedicated air interface identity information.

9. The method according to claim 6, wherein before obtaining, by the first access network device, the dedicated air interface identity of the UE based on the first request message, the method further comprises:
determining, by the first access network device based on the first request message, to allow the UE to access the first access network device.

10. The method according to claim 6, wherein sending the dedicated air interface identity information to the UE comprises:
sending, by the first access network device, a response message to the UE, wherein the response message carries attach success indication information and the dedicated air interface identity information.

11. User equipment, comprising:
a memory comprising instructions; and
a processor in communication with the memory, wherein the processor is configured to execute the instructions to cause the user equipment to:
determine, when the user equipment (UE) is in an idle state, whether there is to-be-transmitted uplink information; and
send, when it is determined that there is to-be-transmitted uplink information, a first request message to a first access network device, wherein the first request message is a first air interface message for the UE to switch from the idle state to a connected state, and the first request message carries uplink non-access stratum (NAS) information, an attach request message and air interface and air interface identity information that is stored on the UE, wherein the first access network device, after receives the first request message, is configured to:
send a third request message to a core network device, wherein the third request message carries the attach request message;
receive an acknowledgement message sent by the core network device, wherein the acknowledgement message carries the dedicated air interface identity information; and
obtain the dedicated air interface identity information of the UE from the acknowledgement message.

12. The user equipment according to claim 11, wherein the uplink NAS information comprises an attach request message, and the processor is further configured to execute the instructions to cause the user equipment to:
store air interface identity information that is pre-allocated by the first access network device to the UE before the UE performs an attach process, wherein the air interface identity information corresponds to at least one UE that communicates with the first access network device.

13. The user equipment according to claim 12, wherein the processor is further configured to execute the instructions to cause the user equipment to:

receive a response message sent by the first access network device, wherein the response message carries attach success indication information and dedicated air interface identity information of the UE, and the dedicated air interface identity information is allocated by the core network device or the first access network device to the UE; and store the dedicated air interface identity information.

14. The user equipment according to claim 11, wherein the uplink NAS information comprises NAS data, and the processor is further configured to execute the instructions to cause the user equipment to:

receive dedicated air interface identity information sent by the core network device, wherein the dedicated air interface identity information is allocated by the core network device or the first access network device to the UE; and store the dedicated air interface identity information.

15. The user equipment according to claim 11, wherein the uplink NAS information comprises NAS data, and the processor is configured to execute the instructions to cause the user equipment to:

send the first request message to the first access network device when it is determined that an access network device communicating with the UE has been switched to the first access network device, wherein the first request message further carries indication information, and the indication information is used to indicate that the access network device communicating with the UE has been switched.

* * * * *